United States Patent [19]
Lemont

[11] Patent Number: 5,470,202
[45] Date of Patent: Nov. 28, 1995

[54] PROPULSIVE THRUST RING SYSTEM

[76] Inventor: Harold E. Lemont, 117 W. Church St., Seymour, Conn. 06483

[21] Appl. No.: 148,992

[22] Filed: Nov. 8, 1993

Related U.S. Application Data

[60] Division of Ser. No. 711,622, Jun. 5, 1991, Pat. No. 5,292,088, which is a continuation-in-part of Ser. No. 419,137, Oct. 10, 1989, abandoned.

[51] Int. Cl.⁶ .................................................. F04D 19/02
[52] U.S. Cl. .................................. 415/211.1; 416/247 R
[58] Field of Search ............................... 440/66, 67, 71, 440/72; 244/12.2, 65; 416/247 R; 114/166; 415/208.1, 208.2, 208.3, 208.4, 208.5, 209.1, 209.2, 209.3, 209.4, 210.1, 211.1, 211.2

[56] References Cited

U.S. PATENT DOCUMENTS

| | | |
|---|---|---|
| 2,056,547 | 10/1936 | Weber . |
| 2,123,657 | 7/1938 | Munk . |
| 2,142,834 | 1/1939 | Bergstrom . |
| 2,337,954 | 12/1943 | Wolf . |
| 2,369,279 | 2/1945 | Carnaghan et al. . |
| 2,439,124 | 4/1948 | Bergstrom . |
| 2,510,561 | 6/1950 | De Laval . |
| 2,618,435 | 11/1952 | Koch . |
| 2,625,319 | 1/1953 | Reisch . |
| 2,628,020 | 2/1953 | Koch . |
| 2,876,964 | 3/1959 | Streib . |
| 2,922,277 | 1/1960 | Bertin . |
| 2,981,464 | 4/1961 | Omohundro . |
| 3,054,578 | 9/1962 | Brocard . |
| 3,129,905 | 4/1964 | Taylor . |
| 3,181,811 | 5/1965 | Maksim . |
| 3,289,922 | 12/1966 | Sawyer . |
| 3,489,374 | 1/1970 | Morcom . |

(List continued on next page.)

FOREIGN PATENT DOCUMENTS

| | | |
|---|---|---|
| 737957 | 12/1932 | France . |
| 1444868 | 12/1966 | France . |
| 458941 | 8/1968 | France . |
| 2846217 | 6/1978 | Germany . |
| 2718178 | 11/1978 | Germany . |
| 1090 | of 1878 | United Kingdom . |
| 292493 | 9/1928 | United Kingdom . |
| 629381 | 9/1941 | United Kingdom . |
| 629383 | 9/1949 | United Kingdom . |

OTHER PUBLICATIONS

H. E. Lemont, Design for Operating Environment–Ring–Fin Tail Rotor Program, presented at the American Helicopter society, Mideast Region, Oct. 22–24, 1980.
H. E. Lemont, Ringfin Augmentation Effects, presented at the 38th Annual Forum of the American Helicopter Society, May, 1982.

*Primary Examiner*—Michael S. Huppert
*Assistant Examiner*—Thomas J. Brahan
*Attorney, Agent, or Firm*—St. Onge Steward Johnston & Reens

[57] ABSTRACT

A low-aspect ratio propeller system is provided with a multiple ring structure formed with a plurality of circular or non-circular, annular, narrow equivalent air foil rings which are held by rails in a predetermined relationship with the propeller blades. The upstream ring is located downstream from the tip vortex of the propeller within the axial span of the propeller. One or more additional downstream-located rings are used so as to provide at least one annular multiple ring-defined pump aperture through which peripheral vortices generated by the propeller blades or fan blades may enhance the mass flow. In one propeller system, a low-aspect-ratio propeller is employed with high blade angles of attack and non-stall capability to generate strong vortices which enhance the beneficial effect of the multiple ring structure. These vortices increase thrust because their induction action on the rings increase beneficial ring flow circulation. Augmented ring flow reduces the velocities in the expanding wake by increasing the mass flow. The destruction of tip and root vortices reduces noise. The multiple ring structure also serves as a guard to protect people and animals against the rotating propeller. A plurality of embodiments are shown and described.

19 Claims, 12 Drawing Sheets

U.S. PATENT DOCUMENTS

| | | |
|---|---|---|
| 3,506,219 | 4/1970 | Mouille et al. . |
| 3,528,382 | 9/1970 | Clark . |
| 3,722,454 | 3/1973 | Silvester . |
| 3,738,307 | 6/1973 | Jacobsen et al. . |
| 3,742,895 | 7/1973 | Horiuchi . |
| 3,814,538 | 6/1974 | Sjoqvist . |
| 3,856,238 | 12/1974 | Malvestuto . |
| 4,031,846 | 6/1977 | Tone . |
| 4,152,094 | 5/1979 | Honda et al. . |
| 4,196,877 | 4/1980 | Mutrux . |
| 4,506,849 | 3/1985 | Lemont . |
| 4,637,801 | 1/1987 | Schultz . |
| 4,666,411 | 5/1987 | Silvester . |
| 4,689,026 | 8/1987 | Small . |
| 4,694,645 | 9/1987 | Flyborg et al. . |
| 4,815,995 | 3/9189 | Ingvason . |
| 5,292,088 | 3/1994 | Lemont . |

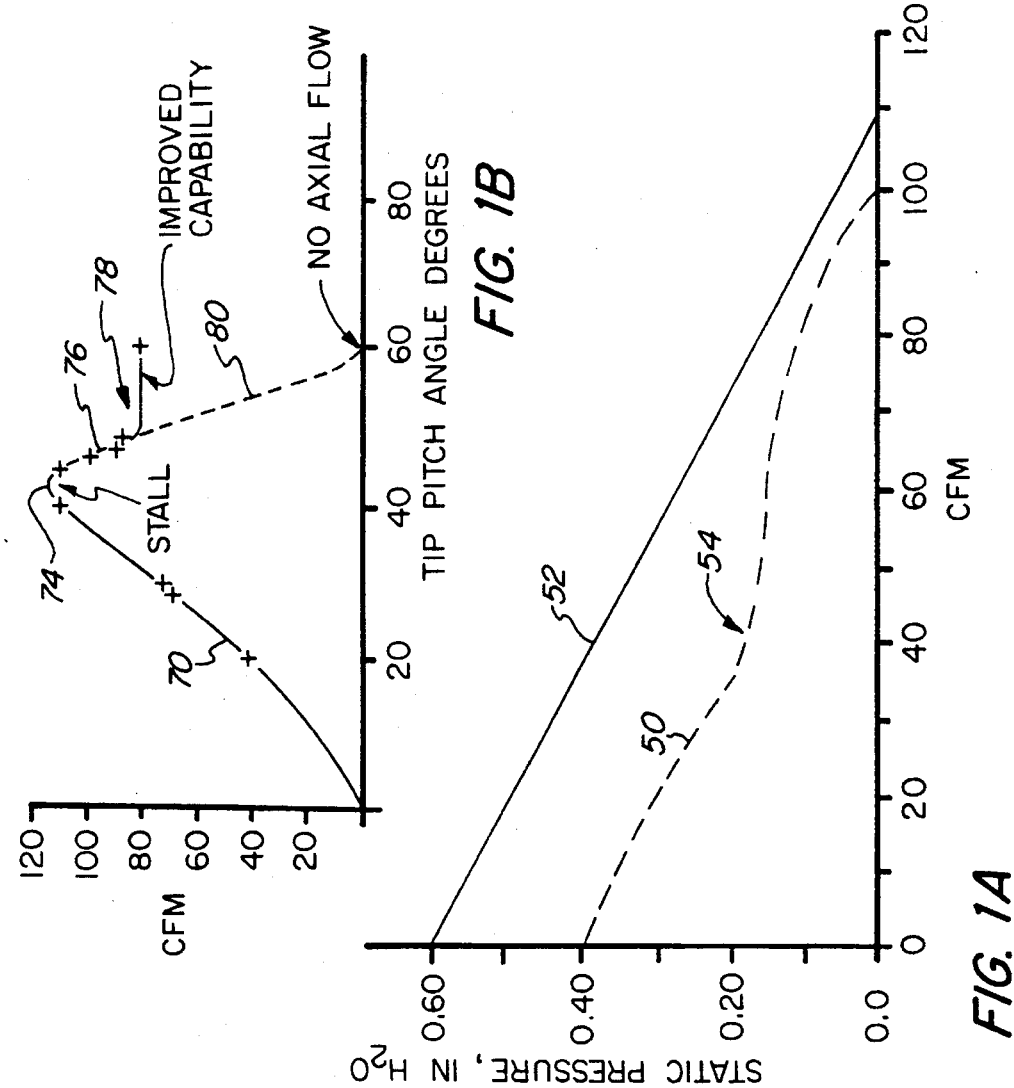
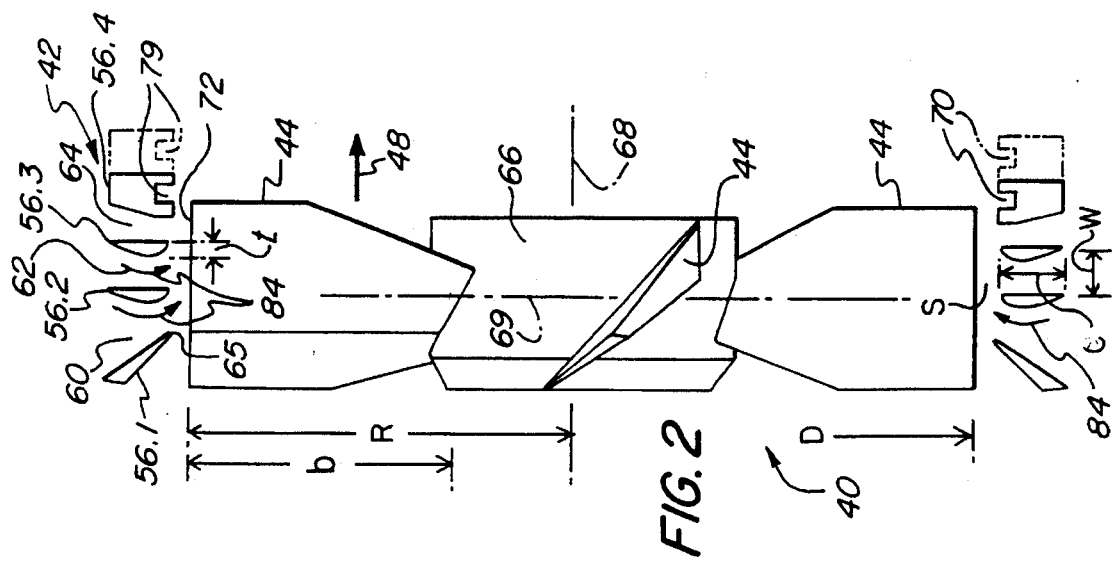

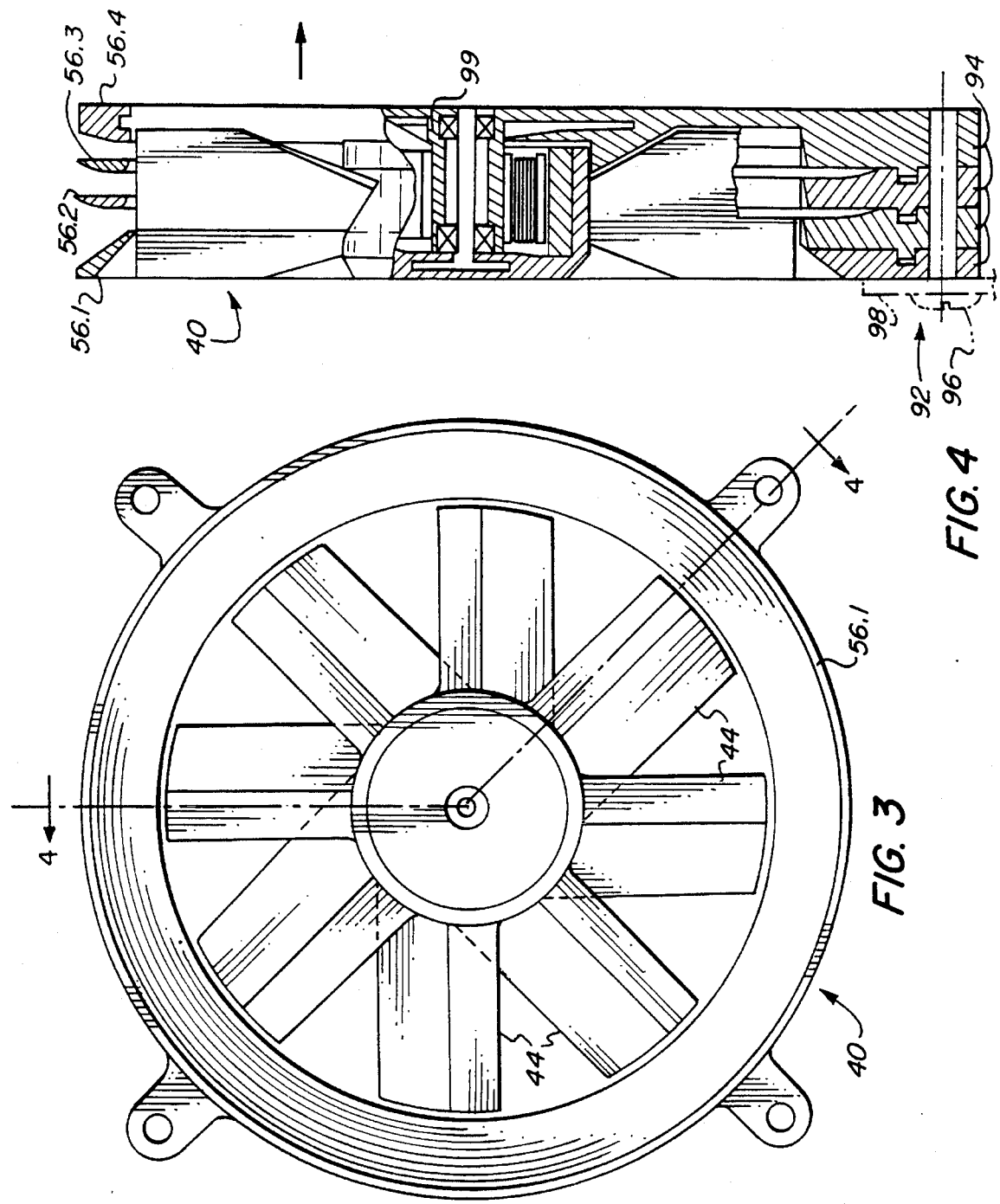

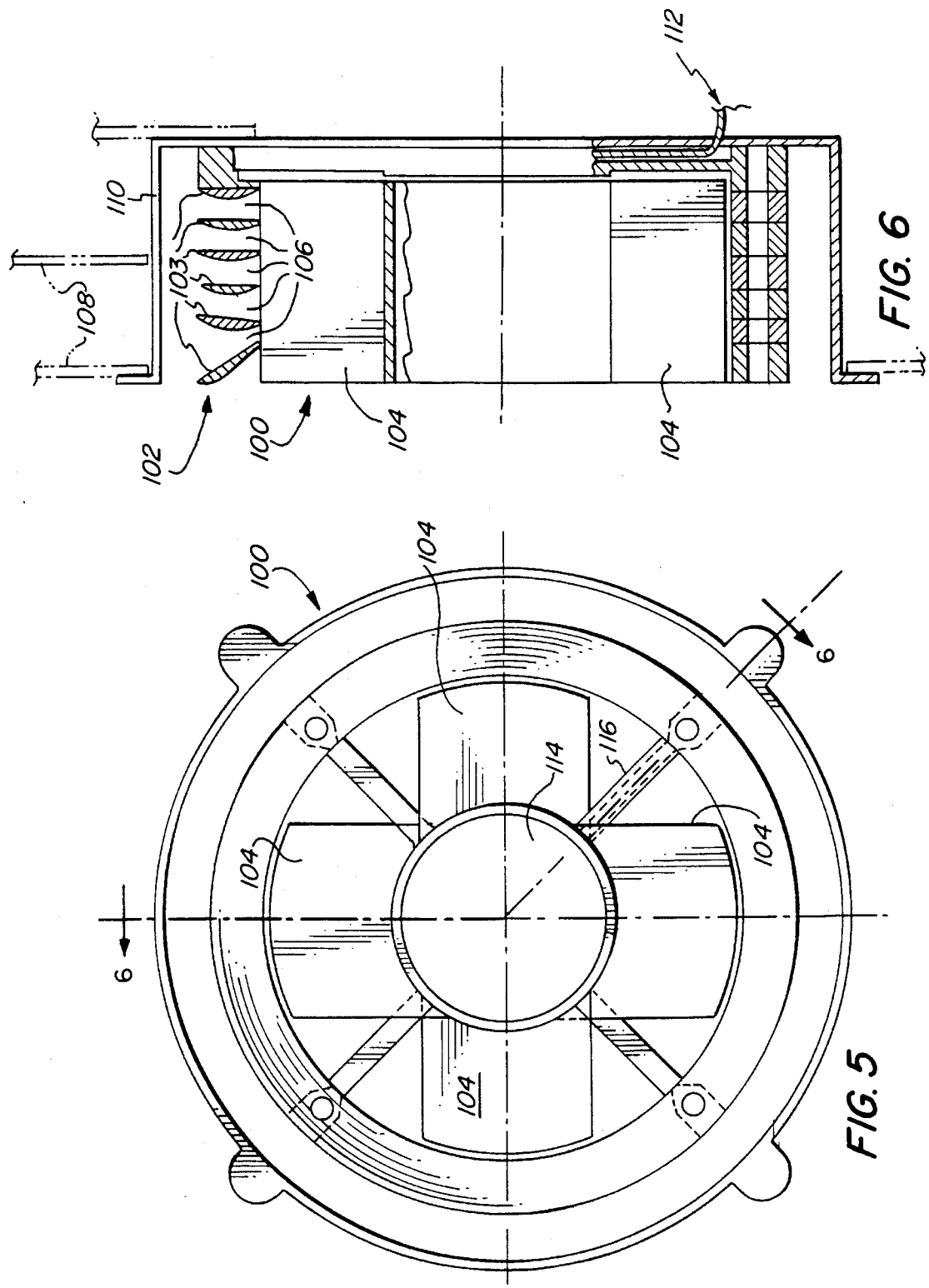

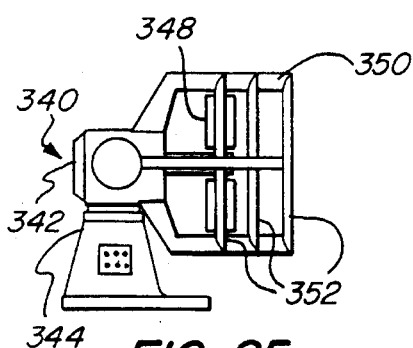
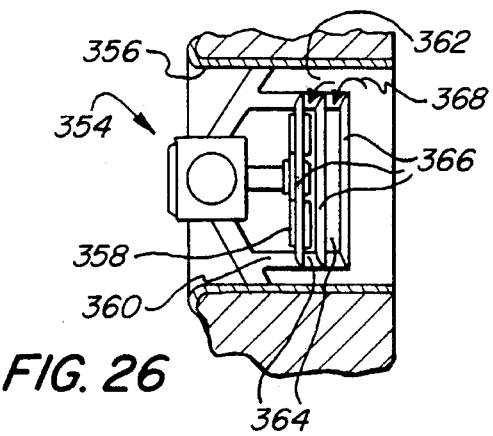
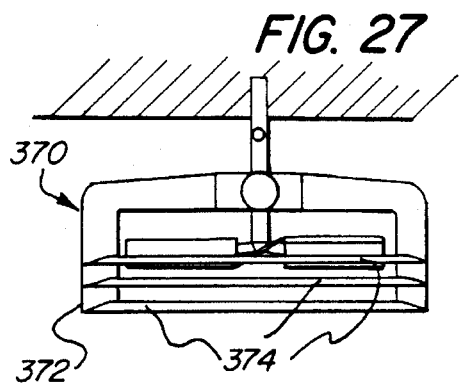
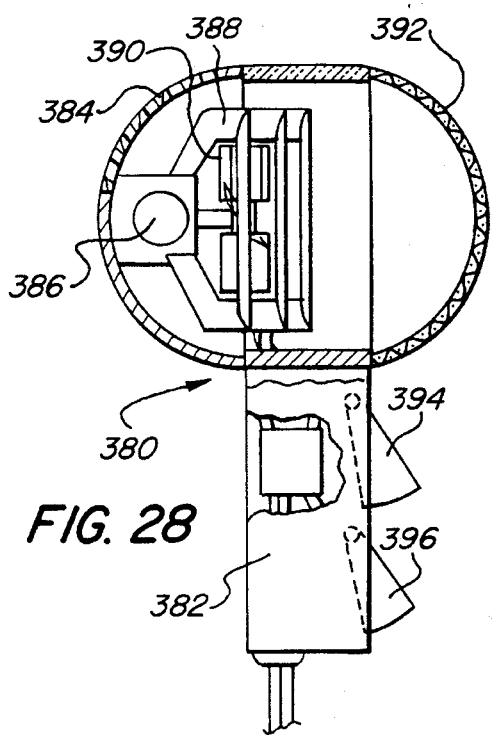
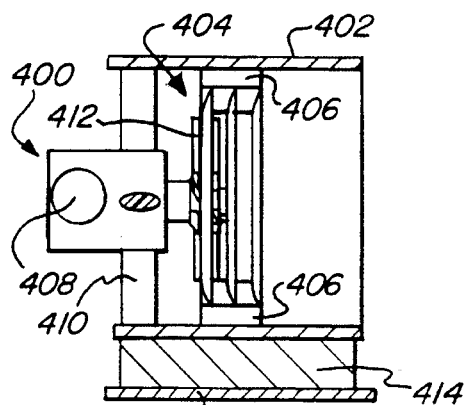
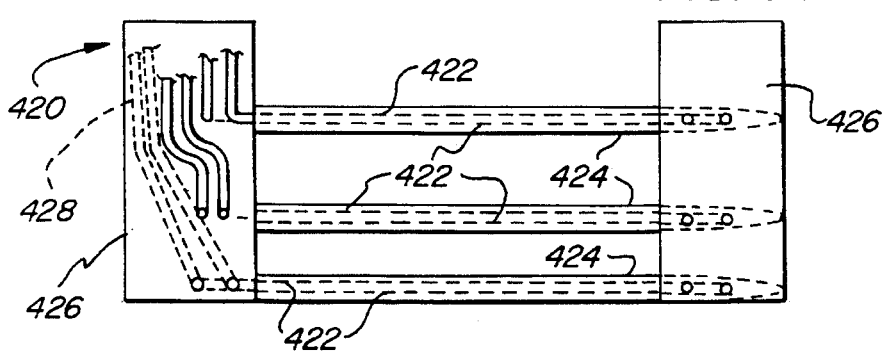

5,470,202

PROPULSIVE THRUST RING SYSTEM

PRIOR APPLICATION

This is a divisional of application Ser. No. 07/711,622 filed on Jun. 5, 1991, now U.S. Pat. No. 5,292,088 which was a continuation in part of patent application Ser. No. 419,137 filed Oct. 10, 1989, now abandoned.

TECHNICAL FIELD

This invention generally relates to improved fluid moving and mixing by fans and propellers, as well as propeller and fan-driven vehicles, and particularly, to an improved propulsion system to augment and control thrust for boats and all types of aircraft, fans, and other fluid-moving devices.

BACKGROUND ART

Propellers or related rotating forms such as rotors, fans, and screws are an integral aspect in the design of boats and aircraft. Present watercraft screws are of low efficiency, having high noise signatures and are limited by water cavitating effects on blades. Their lack of safety with impact on manatees, people in the water, and submerged objects is frequently reported in the daily press. Proper stopping of small watercraft moving at 60 mph is questionable; no practical braking system presently exists to help avoid running into other crafts, swimmers, and debris. Large propellers rotating at slow speeds are a necessary ship design selection and, because of ship/screw size relationships, have marked flow interferences from the ship body resulting in a lower efficiency.

Airplane propellers and helicopter tail rotors, to have acceptable efficiencies, must move large volumes of air with a relatively low induced acceleration of the flow. The sizes of such rotors are relatively limited; therefore, to provide sufficient thrust, these are driven with high blade tip velocities. Tip vortices produced by high thrust/tip speed conditions add to the noise of the system.

Therefore, there is a need for a structural system which improves performance from propellers by enhancing their thrust, horsepower, and reducing their noise. A need also exists for a cage, which provides safety from impact by the propeller on inert or living objects, and protects the propeller without imposing a penalty on the performance of the propeller. A need also exists to reduce noise levels from the operation of a propeller used on watercraft, aircraft, helicopters and fans.

Previous patents were researched in the fields of propellers, screws, safety devices and for means of increasing propeller thrust with the following results:

U.S. Pat. No. 4,689,026 to M. S. Small relates to propeller screws and shows a square tunnel enclosing a screw which system would have excessive water drag and low flow efficiency because of the tunnel corners plus turning losses of the water.

U.S. Pat. No. 4,666,411 is for a tubular, ship-wake generator which is also a high drag non-propulsive item.

U.S. Pat. No. 4,031,846 to V. W. Tone describes a guiding drive and conical semi-cover which might act as an anti-ventilation plate but would definitely not be propulsive. As the conical plate covered only the tip of the propeller, it would not act as a safety guard.

U.S. Pat. No. 3,742,895 describes a rudder in the propeller wake for steering and is not related to my invention.

U.S. Pat. No. 3,528,382 describes a flow straightener to recover the rotational energy in the water wake by straightening the wake. This represents a small thrust gain at best in that wake velocity measurements indicate skew angles of flow to the shaft axis of rotation of less than 15° at most. This would increase the thrust by 3.5% at most if no drag for the anti-rotation vanes existed; no appreciable positive thrust effects could be expected.

U.S. Pat. No. 4,580,517 describes a shrouded propeller located in a tube which is a nonpropulsive shroud system in forward motion. The tube, which in a static thrust condition improves the thrust, has such a high drag with speed as to force a large penalty in power required for motion.

U.S. Pat. No. 3,722,454 shows a long, fluid tube adjacent to a propeller. The high skin friction of this device during forward motion precludes its use because of extreme power requirements at all but very low forward speeds.

U.S. Pat. No. 4,441,163 shows a non-propulsive cage to protect the propeller. This cage, being non-propulsive in nature, causes excessive power to be required at any reasonable operating speed.

U.S. Pat. No. 4,078,516 to D. C. Babus shows a non-propulsive cage again with the same high drag characteristics noted above.

U.S. Pat. No. 3,968,944 to Freidheim Zimmer shows a tapered contracting shroud with a propeller located in the entrance. This again would present a high drag item as the shroud is non-propulsive in nature.

It may be noted that most of the above prior art describing shrouds or tunnels do protect personnel and/or sea creatures from propeller contact, but at the expense of efficient performance and with high power requirements because these are high-drag items.

My invention achieves the safety provided by a cage but with propulsive thrust augmentation even with reduced input power that can be as little as one-half of normal propeller power required to deliver the same speed.

A related U.S. Pat. No. 4,506,849, Helicopter Rotor Thrust Ring to H. E. Lemont, describes use of a single thrust ring around a tail rotor. Both crossflows from the main rotor and from translational flight are used to enhance thrust from the thrust ring. The area of the single thrust ring required to adopt it for sufficient axial propulsion augmentation would impose too much drag to operate successfully in an axial, high-speed mode.

Townend rings (an early method of streamlining radial aircraft engines) have been used to enclose aircraft propellers to augment thrust. This is an aircraft variant of the shrouds of U.S. Pat. Nos. 3,722,454 and 3,969,944 mentioned above. The same objections which apply to watercraft also apply to air applications. While these Townend rings boost static ground thrust, at moderate aircraft translational speeds drag soon equals the increased thrust effect to reduce the net effectiveness to zero.

Transport aircraft use propulsive fans which are included within a duct/cowling system for noise control. Thrust enhancement by the distribution of negative air pressures on the cowl lip as well as the elimination of the blade tip vortices when the fan blades are located in the duct are claimed. Variations of duct lip pressures with translational and cross flow cause changes in internal duct air velocities, both in direction and magnitude to effect internal fan face velocity distributions. This upsets the match of the required fan blade twist to the duct internal radial air flow distribution and reduces efficiency. To eliminate the tip vortices, the fan blade tips need to be very close to the duct wall (less than 0.5% of the radius) with subsequent clearance problems. The small clearance creates a major disadvantage because of the additional weight required to stiffen the duct structure to prevent contact by the fast-moving blades.

Patents that were cited as references against U.S. Pat. No. 4,506,849 use the principle of edgewise cross flow during translational flight velocity to achieve lift; thus, exhibiting similar limitations as noted for the '849 patent.

SUMMARY OF THE INVENTION

With a thrust augmentation device in accordance with the invention, a substantially improved thrust is obtained from a fan or propeller. This is achieved by employing a multiple ring structure wherein a plurality of rings are axially-spaced from each other by a thrust enhancing distance. One thrust ring is located radially opposite the rotating blades with at least one other ring axially-spaced downstream so as to form a ring-defined annular pump aperture. Vortices generated by the rotating blades, whether a fan or propeller, are advantageously used to reenter the main fluid flow through the pump aperture between the rings to augment the main flow.

With a thrust augmentation system in accordance with the invention, an increased volume of fluid flow can be achieved for the same horsepower. For example, a free air fan, which is provided with a ring structure in accordance with the invention, may have its mass flow increased as high as five times for the same horsepower.

Substantial noise reductions are obtained with a ring structure of this invention, both in the plane of the rotating blades as well as at 45° from the plane. The ring structure enhances safety for people and water creatures from rotating blades and enables one to obtain enhanced thrust reversal with a controllable-pitch blade. The blades can be of economical flat plate low-aspect-ratio construction.

In one embodiment of the invention described herein, a multiple ring structure is incorporated with a small high-speed fan of the type used to ventilate electronic housings enclosing computer circuits or the like. A plurality of rings are located within the axial width of the fan blades so as to provide at least several annular ring-defined apertures located radially opposite of the fan blade peripheral sweep line. The width of the rings, the spacing between them, their shape, orientation, and thickness are selected to provide thrust augmentation from vortices generated by the rotating fan blades. The result of the multiple rings is an enhanced mass flow as a function of input power, and an excellent static pressure versus flow performance.

A multiple ring structure in accordance with the invention is particularly effective with low-aspect ratio blades, such as encountered in fans, boat propellers, impellers, pumps, turbine engines, blow dryers, heater fans, paint and slurry mixers and the like.

In one axially-extended multiple ring structure in accordance with the invention, at least one ring-defined aperture is radially opposite the rotating blades and one or more ring apertures are located downstream of the blades. This provides an enhanced expanding wake.

With a multiple ring structure in accordance with the invention, much less drag arises than when a single ring is employed. With an appropriate location of the multiple rings, improved thrust augmentation can be achieved resulting in the generation of greater thrust at lower power.

It is, therefore, an object of the invention to improve the thrust obtainable from fans and propellers with less input power than would be obtainable from a conventional fan or propeller of the same size.

Other objects and advantages and social benefits of my invention are as follows:

1. Protection of people, marine life and animals from destructive maiming propeller strikes.
2. Provision of a protective ringcage which contributes positively to increasing the thrust of the enclosed propeller, rotor, or screw of a vehicle and reduces fuel consumption.
3. Provision of extra vehicle propulsion thrust through the use of otherwise wasted induced power represented by the blade tip and root vortices by a multiple ring action to save fuel, travel faster, and to provide a more efficient vehicle.
4. Better control of thrust magnitudes including reversal with a variable-pitch propeller to brake a vehicle in emergency or other situations.
5. Reduction of noise from fan or propeller vortices. Enable the quiet operation of fans, heaters, hair dryers, and the like.
6. Improve the fuel efficiency of a fan or propeller with an economic thrust augmentation system. Significant travel costs savings for boats, ships, aircraft, submarines, and the like can be achieved. Since there are no moving parts in the multiple ring structure of this invention, it will last a long time and its life cycle costs can be expected to be extremely low.
7. The thrust augmentation achieved by my invention can be applied to many types of blades involved in propulsion; air or fluid mixing; pumping of gases, slurries, sludges, and grains; and the movement of air or other media as required such as in fans, heaters, hair dryers, oil burners, transmission pipe line inline pumps, etc.
8. Facilitate the separation of major-sized particles in the air or water being moved through the rings.

The present invention comprises a multiple ring structure that can be used in combination with low-aspect-ratio multi-blade propellers, fans, impellers, or rotors. The multiple ring structure comprises multiple, axially-spaced rings which form narrow annular airfoils that are separated by an annular ring aperture whose width is expressed as a function of ring chord distance, which in turn is based on the internal to external diameter ratios of the rings. Structure to locate these rings in relation to each other and in the plane of the propeller is a part of the invention. The plane of the first ring being located within the axial length of the propeller and slightly aft of the upstream tip vortices of the propeller. Slight slanting of the forward ring and larger angles of the subsequent downstream rings to the plane of the propeller has beneficial effects for some applications. The propeller has its tip and root vortices associated with the wash increased in strength by the low-aspect-ratio blades, special foil sections, and planform shapes to enhance the thrust action of the ringcage structure. The ringcage converts these vortices into extra thrust by converting their normally-wasted rotative energies as forces acting in the direction of thrust produced by the propeller.

These and other advantages and objects of the invention can be understood from the following description of several embodiments as shown in the drawings.

BRIEF DESCRIPTION OF DRAWINGS

For a more complete understanding of the present invention and the advantages thereof, reference is now made to the following description taken in conjunction with the accompanying drawings in which:

FIG. 1A are curves of the static pressure of a fan with a multiple ring structure in accordance with the invention and of a conventional slightly larger fan;

FIG. 1B are curves of mass flow as a function of the tip pitch angle for a fan using a multiple ring structure in accordance with the invention and for a conventional fan;

FIG. 2 is schematic representation of a multiple ring structure and a fan with which it is used;

FIG. 3 is a front view of a fan in accordance with the invention;

FIG. 4 is a side view of the propeller portion of the fan shown in FIG. 3;

FIG. 5 is a front view in elevation of a fan of this invention;

FIG. 6 is a side sectional view of the fan of FIG. 7 taken along the line 6—6 therein;

FIG. 25 is a side view in elevation of a quiet ventilation/ heating fan having a low-aspect-ratio fan and a ringcage system of this invention;

FIG. 26 is an elevation and partial cross sectional view of an exhaust fan in a duct with a low-aspect-ratio blades and a ringcage system of this invention;

FIG. 27 is an elevation view of a quiet ceiling ventilation heating fan with low-aspect-ratio blades and a ringcage system of this invention;

FIG. 28 is an elevation and partial cross sectional view of a hair dryer with a low-aspect-ratio fan blades and a ringcage system of this invention;

FIG. 29 is an elevation and partial cross-sectional view of a heater/blower for vehicles with a low-aspect-ratio fan and a ringcage system of this invention;

FIG. 30 is a cross section view of a ringcage system of this invention with heating elements;

DETAILED DESCRIPTION OF DRAWINGS

Figure 7:
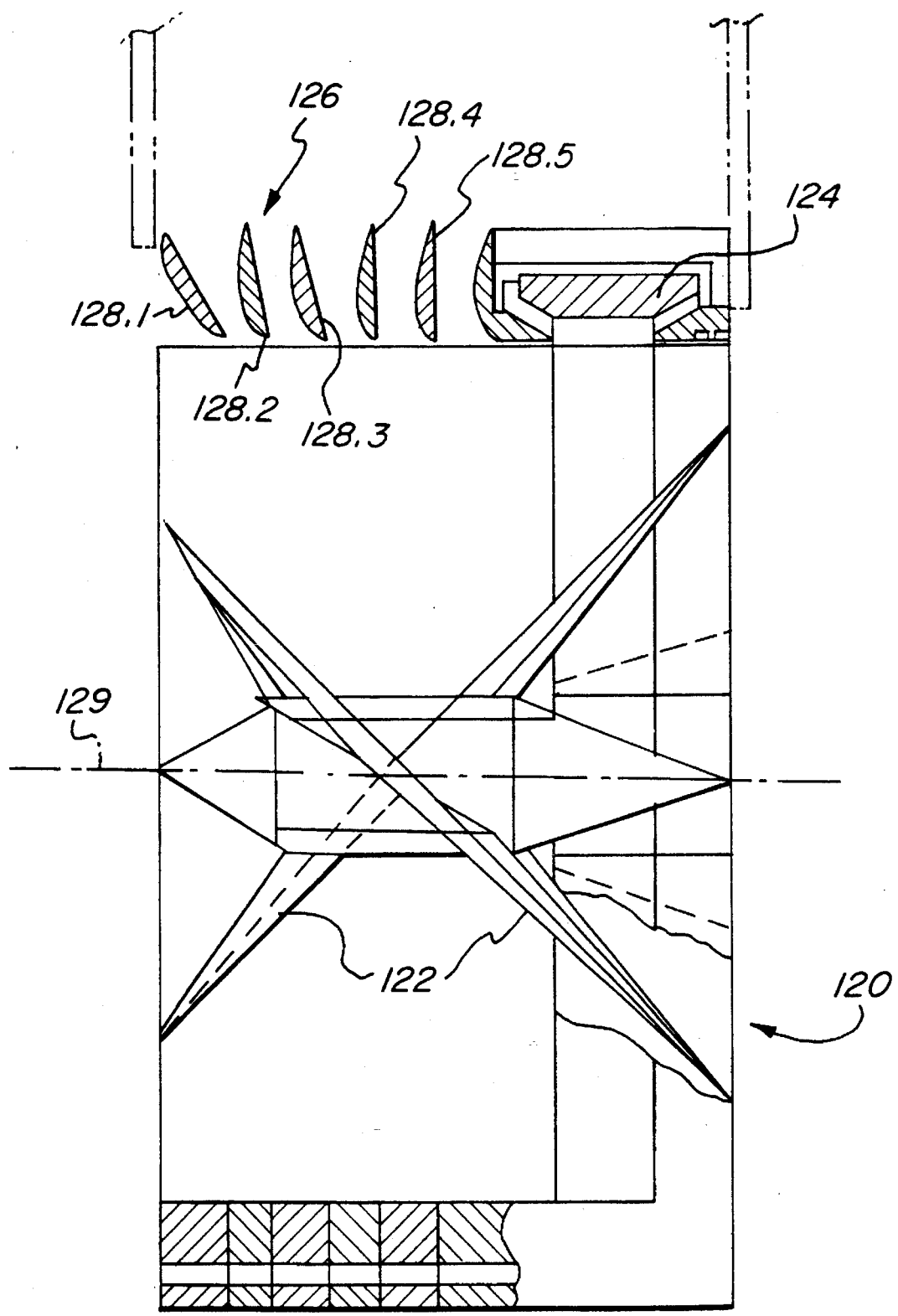
FIG. 7 is a side sectional view; like FIG. 6 of a fan employing a peripheral motor drive.

With reference to FIGS. 1–5, a fan 40 in accordance with the invention is shown. The fan 40 is provided with a multiple ring structure 42 whereby thrust developed by propeller blades 44 in the direction of arrow 48 is significantly augmented. FIG. 1 illustrates two static pressure curves 50, 52. Curve 50 is for a standard in-tube fan of similar size, but slightly larger (4.41" diameter), than for fan 40 (4.00" diameter). Curve 52 is for fan 40 with the ringcage structure 42.

Of particular significance is the increased (doubled) mass flow obtained with fan 40 at the normal operating static pressure of about 0.2 inches of water. The non-linear dip 54 that is normally present in a static pressure curve for a standard in-tube fan is substantially eliminated with fan 40. Curve 52 is essentially a straight line, but may vary from that depending on the fan configuration.

This significantly improved performance by fan 40 is achieved with multiple ring structure 42. This includes at least two rings and in the embodiment a plurality of rings 56.1, 56.2, 56.3 and 56.4 which are radially spaced from the peripheral sweep line of fan blades 44 and located within the axial distance of propeller blades 46. Ring 56.1 also serves as a mount for fan 40 to a suitable surface.

The multiple ring structure 42 has three annular ring-defined apertures 60, 62, 64, through which air flow mixing with tip shed vortices provides flow augmentation. The rings 56.2 and 56.3 are annular, relatively thin air foil structures whose radial width (outer radius less inner radius) or chord, c, and axial spacing, w, are selected to enhance flow augmentation by the ring structure 42. If the ring chord, c, is made too large, the augmentation effect tends to diminish and drag in vehicular application may become too large. If the ring chord is too small, the augmentation effect also tends to diminish. The size for the ring chord, c, can be expressed as a function of the fan radius R and preferably should be in the range from about 0.15 R to about 0.59 R. Particularly effective flow augmentation was found at a ring chord dimension of about 0.25 R.

Ring thickness t also affects performance with augmentation being reduced when a ring is too thick or too thin. Generally, a ring's thickness is expressed as a function of the chord size c. The ring thickness t preferably is in the range from about 0.1 c to about 0.4 c with augmentation flow generally declining as the ring thickness approaches 0.35 c. Ring maximum thickness generally was found to yield maximum static flow augmentation from about 0.15 c to about 0.2 c. In one multiple ring structure using four rings with a two bladed propeller in an eight inch diameter fan, an optimum value for the ring thickness t was 0.2 c. Improved mass flow can be obtained even with a ring thickness smaller than 0.1 c.

The axial spacings W between rings, i.e. the axial widths, w, of annular ring defined apertures 60, 62, 64 should be sufficient for air flow from vortices to augment the mass flow. If the apertures are widened, flow augmentation gradually reduces. When the aperture width w becomes zero, performance approaches the augmentation obtained with a single ring. Preferably, the widths, w, of the ring flow apertures are generally selected to between about half to about four ring chord lengths c, though variations from this range may be encountered with different media such as air and water. In one multiple-ring structure for an eight inch, two-bladed fan as described above with a ring thickness of 0.21 c and a fan solidity ratio of 0.2, and with ring spacings of about two chords c, a 40% improvement in mass flow was obtained relative to a fan alone. Mass flow augmentation from the use of a single ring was about 16%.

The axial location of the forward ring relative to the plane of rotation 67 affects the flow augmentation. Generally, the trailing edge 65 of the upstream, or forward, ring 56.1 should not be forward of the tip vortex and preferably is located in the vicinity of the plane of rotation 67. The trailing edge 65 of the forward ring can be forward of plane 69 or downstream. Generally, flow augmentation reduces more rapidly as the position of edge 65 is moved forwardly than rearwardly. Augmentation of the flow was obtained for one fan, using a pair of blades as long as the trailing edge, such as 65, of the forward ring was no further forward from the plane of rotation than about 0.06 of the radius R of the propeller and no further downstream than about 0.2 R. Variations from these locations can be made depending on various propeller factors, such as the strength of the vortices produced by the blades.

FIG. 1B illustrates the significant improvement achieved with a ring cage structure of this invention. Curve 70 represents the mass flow as a function of the pitch angle of the tip 72 of a two-bladed, 10 inch diameter fan having a ring spacing of one chord between three rings 56 and a blade twist angle of 15°. As the pitch angle increases, the mass flow increases until it reaches a maximum at 74 at about 43° where stall occurs. Further increases in pitch angle result in a reduction as shown at 76. However, at 78, the curve levels off at about 50° and remains that way at least as far out as 60°.

In a conventional fan, the mass flow continues to decrease as shown at 80 until at about 60° pitch angle, there is essentially no axial flow. This illustrates that the ringcage structure of this invention is particularly effective in converting the stronger vortices generated at higher pitch angles above stall to useful mass flow.

A particular advantage of the ringcage structure 42 is that its inner diameter does not have to be closely spaced to the peripheral sweep line of the propeller blades 44. When the clearance, s, is too small, tolerances required of the fan and mounting structures become tight to avoid inadvertent contact with the ring structure 42. If the clearance, s, is too large, then the beneficial effects from the ringcage structure 42 reduces and a reverse air flow becomes possible. Generally, a clearance s that is of the order of no more than about 10% of the radius R of the propeller blade is acceptable with about 5% of R being normally used.

The multiple ring structure 42 works particularly well with propeller blades 44 having a relatively low aspect ratio. Aspect ratio (AR) for a propeller blade is defined by the relationship $AR = b^2/A$ where b is the exposed length of the blade outside of the hub 66 and A is the blade area outside of the hub. When the aspect ratio for blades 44 is too high, it lowers the strength of the tip vortex and thus the benefit of the ringcage structure 42. With low-aspect-ratio propeller blades 44, a stronger tip vortex is generated which can then be converted to useful mass flow and provide better overall efficiency.

Low-aspect-ratios found suitable typically are in the range from about 0.10 to about 3.0, though the invention can work to some extent with propeller aspect ratios that are outside this range.

In the fan 40, the leading upstream ring 56.1 is inclined relative to the rotational axis 68. Such inclination angle enables a better air flow and may be also used for other downstream rings such as 56.2 and 56.3. The inclination angle can be of the order of 15°, though other angles can be used.

The downstream ring 56.4 is shaped with annular inwardly-facing notches 79 which serve to impede reverse air flows that would otherwise impede the flow augmentation obtained with rings 56.1, 56.2 and 56.3.

Rings 56.2 and 56.3 have an airfoil cross-sectional shape. This provides a preferential emphasis to a flow as shown by arrows 84 around the rings that enhances the mass flow in the direction 48.

FIGS. 3 and 4 illustrate fan 40 with greater detail. As shown at 92 in FIG. 4, the rings 56 are assembled together with interlocking brackets 94 and held by a bolt 96 to a suitable frame 98. Frame 98 encloses a space to be ventilated (not shown). Fan 40 is driven by a motor 99 inside hub 66.

In FIGS. 5 and 6, a fan 100 is shown having a multiple ring structure 102 formed with six rings 103 axially-spaced along the pitch length of the fan blades 104. All of the annular apertures 106 between the rings contribute a positive pumping action whereby significant mass flow augmentation is obtained. Fan 100 can be mounted to one of several suitable frames 108 with a cup-shaped bracket 110. Motor leads 112 are coupled to motor 114 though one of four suitable hollow struts 116 used to support the fan motor 114 and rings 103. Note that where deemed desirable, some or most of the rings 103 can be inclined relative to the rotational axis of the fan blades 104.

FIG. 7 illustrates a fan 120 which has propeller blades 122 that are rotated by a peripheral motor 124. A multiple ring structure 126 is used to augment the mass flow with the rings 128.1, 128.2 and 128.3 inclined at various angles relative to the rotational axis 129.

Figure 8:
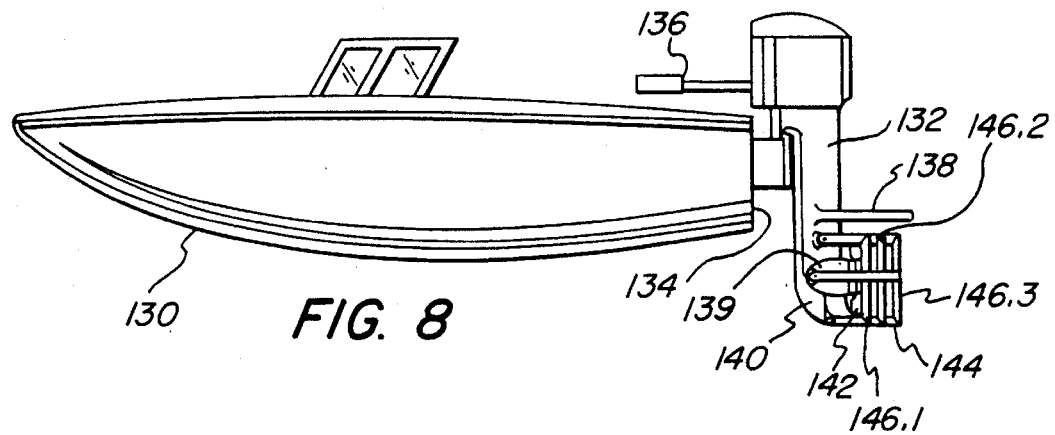
FIG. 8 is an elevation view of a boat equipped with a ringcage system in accordance with the invention.

FIG. 8 shows one form of my invention as applied on an outboard motorboat 130 with an outboard motor 132. This outboard motor 132 has a conventional throttle and steering lever 136 and is typically mounted in accordance with current practice on the boat transom 134. Parts of the outboard motor 132 may be noted in FIG. 8 as the anti-ventilation plate 138 and a lower right-angle gearbox casing 140. My invention consists of two major elements, namely, a low-aspect-ratio blade propeller 142 and a ringcage 144 formed of three axially-spaced rings 146.1, 146.2 and 146.3.

Figure 9:
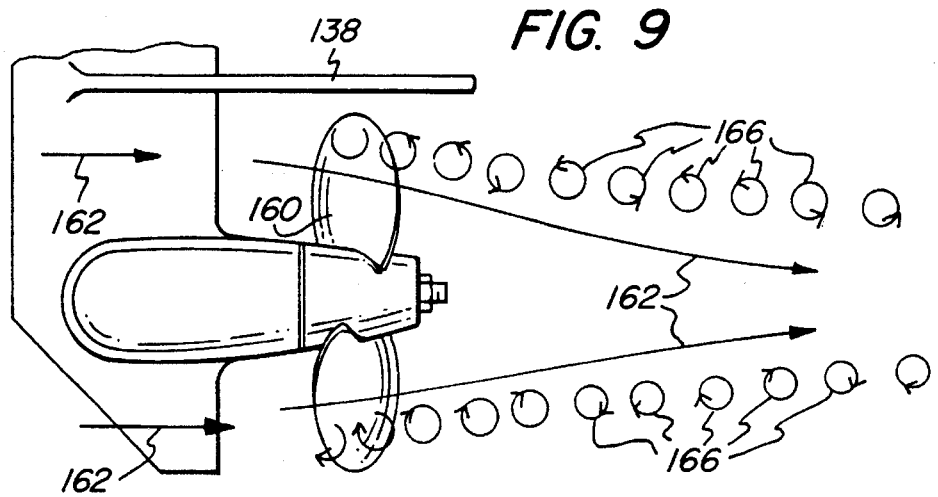
FIG. 9 is a schematic illustration of the flow of water obtained with a conventional boat screw propeller.

Propeller 142 (see FIG. 10) has short, wide, thin blades 152. Special blade 152 planforms enhance the propeller thrust values at high angles of attack by tip and root vortex action as well as special leading-edge cross-sections to increase boundary layer energies. In contrast, normal screws such as shown in FIG. 9 try to minimize these vortices to reduce power losses. With a ringcage 144, a conversion of these vortices into useful thrust energy promotes the use of a propeller design with which vortices are strengthened.

In the embodiments shown in FIGS. 2, 4, 6, 7, and 8, three or more rings are used. It should be understood however that the advantages of a multiple ring structure in accordance with the invention can be obtained with a pair of rings which define an annular vortex pumping aperture between them. The aperture should be located at least partially within the axial pitch length of the propeller blades.

Figure 10:
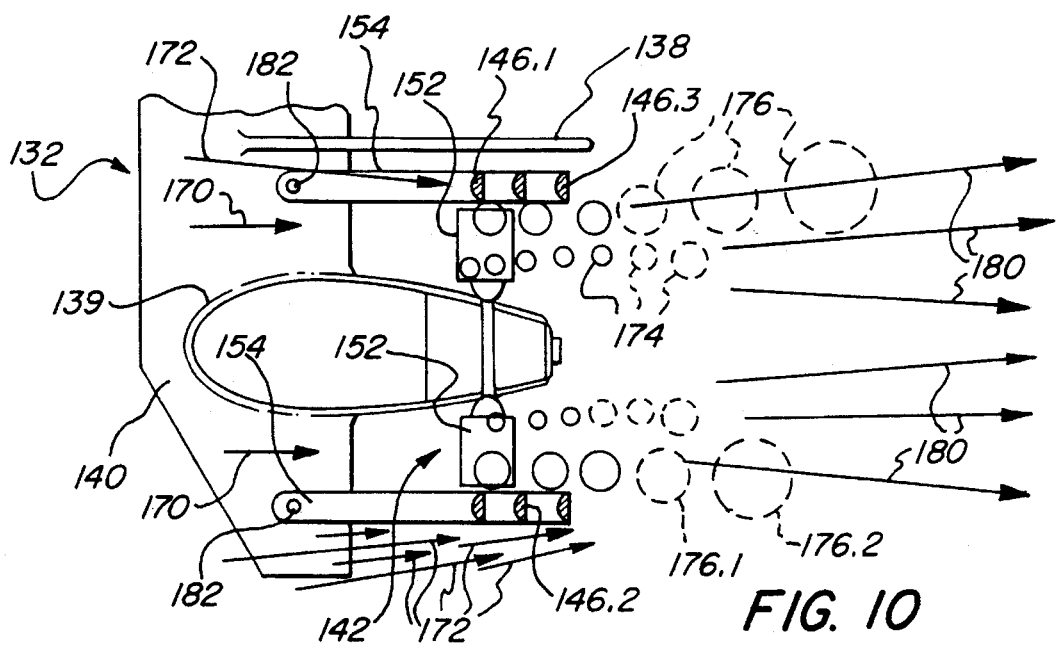
FIG. 10 is a schematic illustration of the flow of water through a propulsive thrust-ring system in accordance with the present invention.
Figure 11:
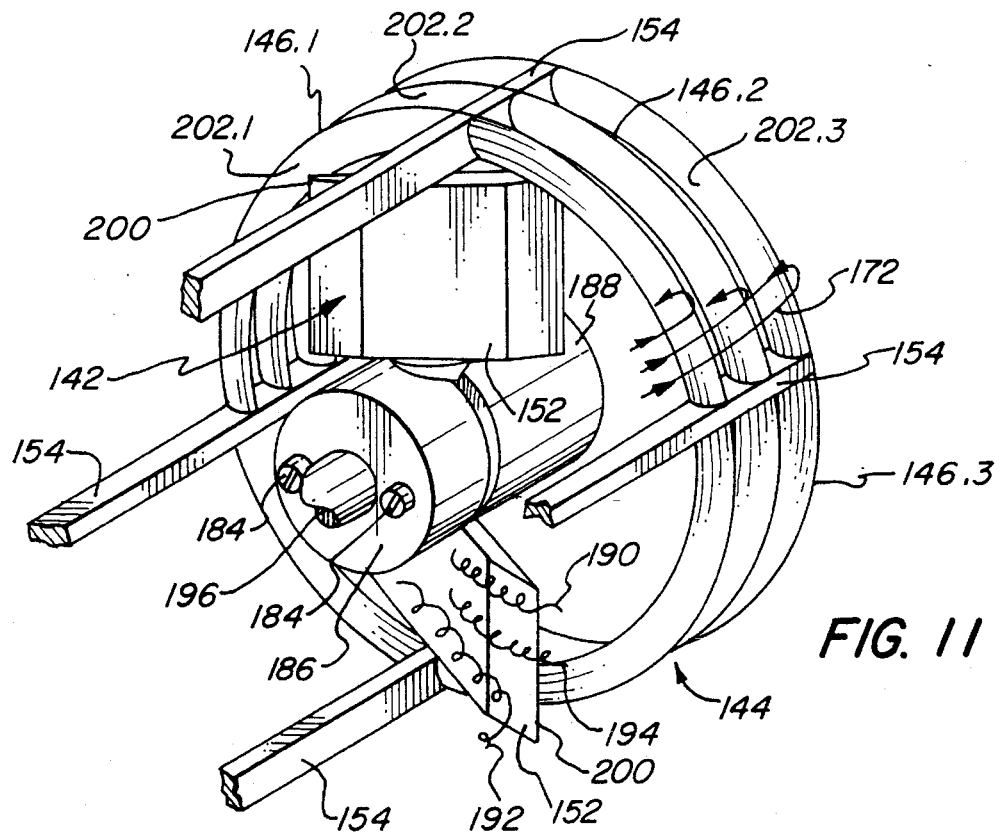
FIG. 11 is a perspective of a low-aspect-ratio propeller with a ringcage structure in accordance with the invention.

In FIGS. 8, 10 and 11, the three rings are shown connected by four angularly-distributed rails 154 which attach to outboard motor 132 and space and support the rings in their proper arrangement in relation to the plane of the propeller 142 to perform their thrust augmentation function. The number of rails 154 may be varied as well as their shape and size. In general, support structure for rings such as provided by rails 154 form a part of ringcage 144 and are located approximately parallel to the waterflow. Rails 154 have cross sections which are shaped to a low drag configuration in accordance with current aerodynamic or hydrodynamic theory as the case may be.

FIG. 9 shows the waterflow about a conventional screw propeller 160 attached to a drive shaft from an outboard motor. Its flow is to be compared with the flow in the propulsive thrust ring system of the invention, as shown in FIG. 10, together with a detailed examination of flow about the individual blade and radial inflow about the rings as shown in FIG. 11.

Propeller 160 of FIG. 9 has a waterflow represented by horizontal vectors 162. A conventional anti-ventilation plate 138 prevents air leakage from the water surface into propeller 160. Propeller 142 adds additional velocity to the affected tube of water which is normally referred to as "induced velocity". In performing this function, the lower pressure on the topside and the higher pressure on the lower side cause a vortex to form near the tip of the blade which flows downstream over the blade and is referred to as a "tip shed vortex". This forms with the inboard flow a reduced cross-sectional wake with high rotational speed boundary vortex velocities. Vortex circles 166 with arrow heads represent the direction of vortex rotational flow in a planar-cut normal to the water flow. The shrinking diameter of the wake but not of vortex circles 166 is a result of added induced velocity by propeller 160.

FIG. 10 shows waterflow of the propulsion thrust ring system 144 as consisting of two parts, one of which is primary flow and the second an induced flow over rings 146. Vectors 170 show primary water flow about the gearcase 140 to propeller 152 and velocity vectors 172 show an induced flow to rings 146. Two sets of vortices are generated by each of propeller blades 152, namely inboard vortices 174 and outboard vortices 176. Flow vectors 172 produce a radial augmentation flow about rings 146 with a mixing with vortices 176.1 and 176.2. This mixing starts at forward ring 146.1 and continues downstream for two to three propeller 142 diameters. The large size of and increase in diameters shown by the outboard vortices 176 and inboard vortices 174 indicate a beneficial conversion of high rotational energy in the vortices when they are small to a slower rotational energy when they are larger. Unlike propeller 142 of FIG. 9, these propeller vortices disappear downstream by adding their rotational energy and mass to the wake. Final wake vectors 180 show a wake expansion caused by the volume of flow from the induced ring velocity vectors 172 plus primary flow vectors 170.

The bolted attachment 182 ringcage 60 to outboard motor 132 does not lie in the primary path of flow, and their projected areas normal to the flow vectors 170 and 172 have a minimal effect on the wake.

FIG. 11 is a perspective view of the propulsive thrust ring system 144 and the previously-defined propeller 142. The propeller 142 is a fixed-position, two blade, variable-pitch propeller with adjustability provided by clamping screws 184 for holding front hub 186 to rear hub 188. Blades 152 are flat plate beveled-edge structures which are held by the action of the clamping screws 184 on the butts of the blades. The waterflow action around the blades 152 is represented by three sets of vortices as shown by inboard vortices 190, by outboard vortices 192 and leading edge vortices 194. The angle of attack of a blade 152 is established by vector 170 (see FIG. 10) and its rotational speed about the axis of shaft 196. The induced velocity created by blades 152 and the augmented velocity flow of vectors 172 result in an orientation as shown in FIG. 11.

Vortices 190 and 192 created by the positive/negative pressure ratio from the lower to the upper surface, of blades 152 cause the edge vortices shown in FIG. 11. These vortices flow from the lower surface to the upper surface and then trail off downstream mixing with the induced ring flow. While these are each shown as a single vortex, for the low-aspect-ratio surface of 1.0 or less, more than one vortex may be generated on each side edge of the blade. Vortices such as 194 are a function of the bevel of the leading edge 200, which may be slightly rounded by a 2% chord leading edge radius 200. At a positive angle-of-attack of blades 152, the sharp edges have separated the flow over the bevel. Flow reattaches to blades 152 after the bevel in a chordwise sense and creates a lift bubble. This lift bubble extends span-wise from the vortices 190 to vortices 192 on the beveled part of blades 152. This creates a significant lift on the blades which, with their low-aspect-ratio forms can make a beveled-flat plate section produce a higher lift/unit area than well-profiled airfoil sections.

Two other significant effects are produced by vortices 190, 192 and 194. One is the energizing of the boundary layer on the upper surface of blades 152 to achieve angles-of-attack exceeding 45° (see FIG. 13) without stalling that would result in a loss of lift and increased drag. Lift values of propeller 142 may exceed twice those of other types. The second effect is that the aforementioned vortices provide a stronger mixing action than a conventional screw propeller 160 (see FIG. 9). This energy which is lost with screw propeller 160 is converted into usable thrust by my invention.

FIG. 11 shows induced flow vectors 172 in perspective.

These may be noted as starting upstream and parallel to the axis of shaft 196, turning, as a result of the influence of the internal ringcage mixing action (fluid sink action) to flow across the forward surfaces 202 of rings 147, and then proceeding downstream. The inward radial flow across the forward surfaces 202 of the rings 146 generates ring lift with consequent thrust improvement.

Figure 12:
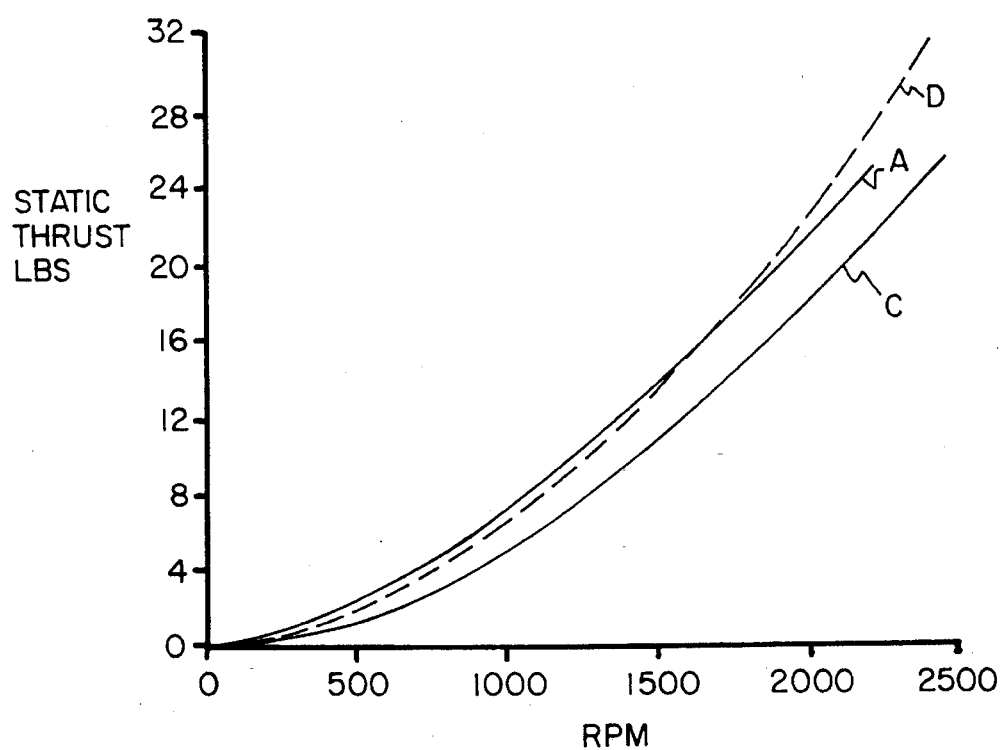
FIG. 12 is a plot of curves to compare the static thrust produced by a conventional screw alone; a low-aspect-ratio propeller having a diameter that is 75% of the diameter of the screw; and a 75% diameter low-aspect-ratio propeller with a propulsion ringcage in accordance with the invention.

FIG. 12 is a graph of test data of the static thrust of different systems for comparing their thrust-producing capabilities. Thrust in pounds generated by each system is plotted against revolutions per minute (RPM) of the propeller shaft. Curve A is a baseline, three-bladed, standard design, semi-elliptical-planform screw such as 142 in FIG. 10. Curve C is a three-bladed 75% diameter propeller as 142 without ringcage 60. Dashed Curve D is for a propeller 142 of Curve C with a ringcage 144 using three rings 146. Interpretation of these data is as follows:

1. At 2000 RPM the thrust of Curve C, which is a smaller propeller than the propeller for Curve A, is about 20% less than for the standard propeller of Curve A.
2. At 2000 RPM, the dashed Curve D for a propeller as for Curve C but with a propulsive thrust-ring system 144 produces a slightly greater thrust than the standard propeller system represented by Curve A.

A conclusion to be drawn from the above is that a smaller diameter propeller 142 with a ringcage 144 and operating at a lower blade tip speed (75% of that of Curve A) will generate the same or slightly greater static thrust. The rings 146 contribute to the total thrust with their induced flow to thus increase the total propulsive force to equal the standard, larger-sized propeller represented by Curve A. A smaller, lower tip speed propeller 142 with a ringcage structure 144 can thus create the same static thrust at a reduced shaft horsepower level as a larger propeller.

Figure 13:
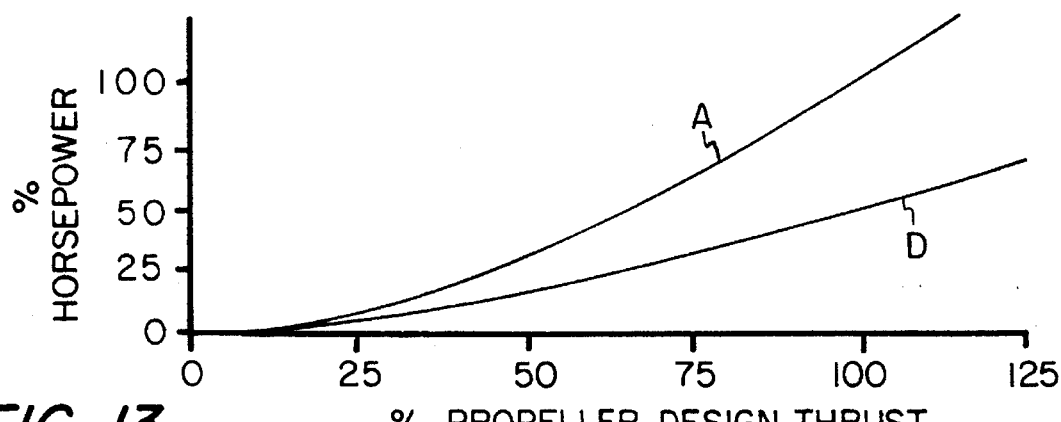
FIG. 13 is a graph with curves to show a comparison of percent thrust horsepower required by a conventional screw with that required by a low-aspect-ratio propeller having a ringcage system in accordance with the invention.

FIG. 13 is a graph of static thrust/horsepower test data on the systems of Curve A and Curve D in FIG. 12. Plotted are data of the percent horsepower of each system against design thrust. At 100% of design thrust, the propulsive thrust-ring system uses about 50% of the horsepower of the standard screw propeller; this is a significant improvement in efficiency.

Figure 14:
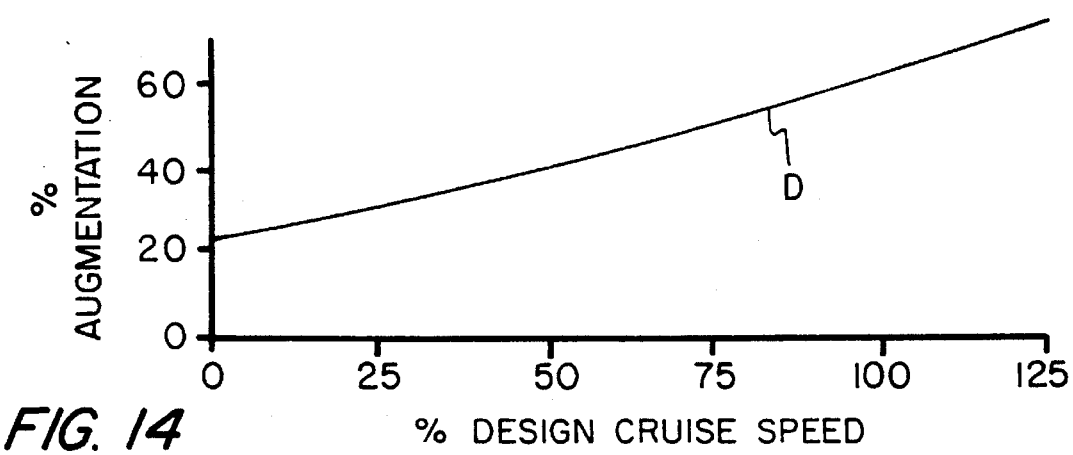
FIG. 14 is a graph of a curve showing the augmentation of vessel speed obtained with a low-aspect-ratio propeller with a ringcage of this invention.

FIG. 14 is a test data graph for a propeller as described with respect to Curve D in FIG. 12 but with a ringcage 144. Curve D illustrates the percent augmentation achieved as a function of percent cruise speed. Augmentation percent is defined as the thrust $T_D$, achieved with a ringcage 144 less the thrust, $T_A$, from a propeller alone, divided by $T_A$, and multiplied by 100. Static thrust augmentation of FIG. 14 at zero translational velocity is about 24% of the thrust from a propeller 142 alone. At the boat's cruise speed, augmentation has increased to about 60%. This augmentation increase illustrated in FIG. 14 is obtained with a reduced horsepower requirement as shown in FIG. 13. Power/energy savings result in high economy, faster, longer-range vehicles for the same fuel usage.

Figure 15:
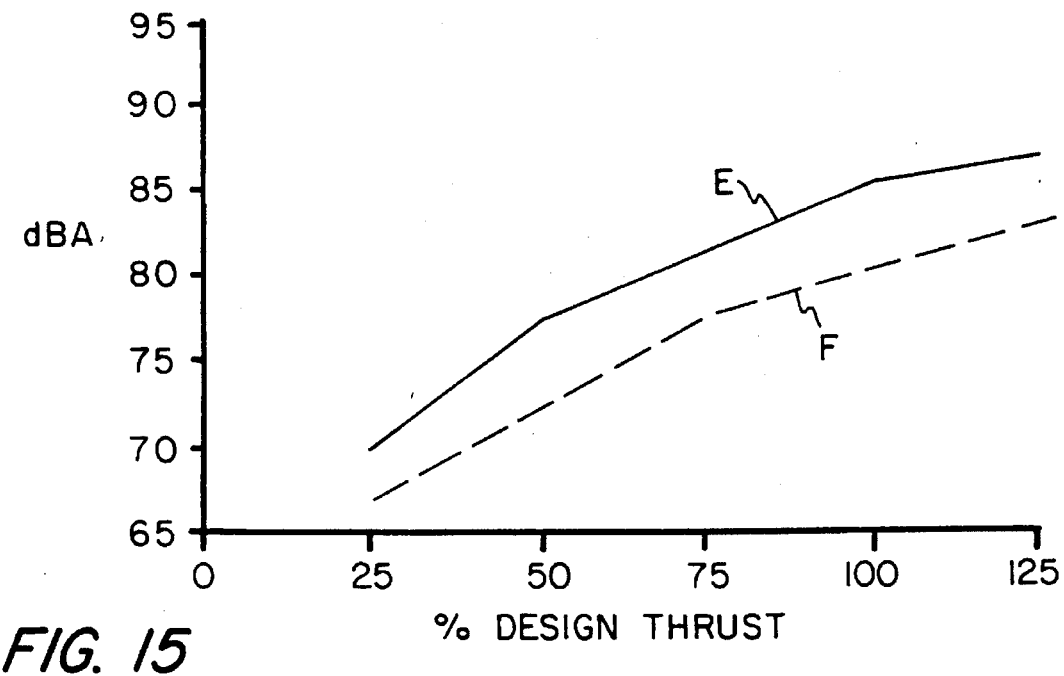
FIG. 15 is a graph of curves showing the noise produced by a low-aspect-ratio air propeller with and without a ringcage of this invention where a microphone is placed both in the plane of the propeller and at 45° to the plane at a distance of 1.50 propeller diameters.

FIG. 15 shows sound measurements of an air propeller where sound intensities (dBA), thrust, and horsepower values were taken throughout a range of revolutions per minute. Microphones were placed at distances of 1.5 diameters of a propeller both in its plane of rotation and at 45° to it. Computer-reduced data are plotted in FIG. 15 which shows the sound intensity for the percentage of the design thrust of a propeller. Data from both like positions were approximately equal. Curve E shows the dBA values of a propeller alone while Curve F shows the effect of adding a ringcage such as 144 to the system.

At 100% of the design thrust value as may be noted from FIG. 15, the quieting is about 5 dBA. Ringcage 144 literally swallows the noise by dissipating propeller vortices.

Figure 16:
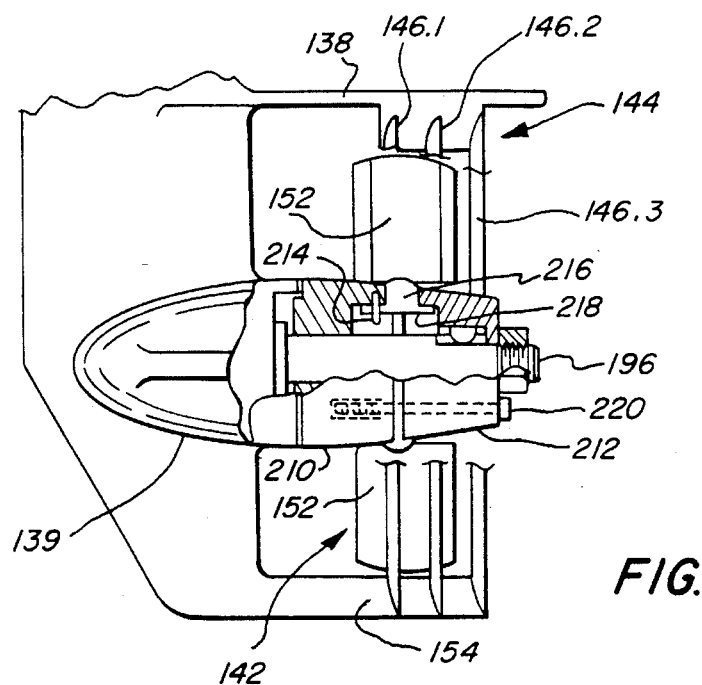
FIG. 16 is an elevational partial section view of a propulsive thrust-ring system of this invention.

FIG. 16 is an elevation view of the propulsive thrust-ring system consisting of propeller 142 and ringcage structure 144. A cross-sectioned portion of the propeller hub has been exposed to clarify its method of construction and parts of rings 146 are eliminated for the same reason. Rails 40 may be cast, molded or otherwise fabricated-integrally with plate 138 and the gear case 139 as shown in FIGS. 8 and 16. Intercostals may be used in critical areas to increase safety. Ringcage 144 has thin rings 146 which have an upstream-facing airfoil section. Rings 146 are narrow, circular, and annular with an internal diameter exceeding propeller 142 diameter by about 5.0%. The outer diameter of rings 146 may vary from 120% to 160% of the propeller diameter depending on the vortex strength of propeller 142 and/or other projected use. Rings 146 and rails 154 may be integrally cast or molded of metal, plastics or composites to form a solid joint at their intersections. Alternately, bolted joints may be used to hold the system together. Individual rings 146 may be attached to lugs on rails 154 or to spacerblocks which separate the rings with throughbolts from aft ring 146.3 to gearcase 139.

The selection of the number of rings 146 used in the ringcage 144 is related to the strength of propeller 142 vortices. Two or more rings 146 are needed to achieve the required propulsive force for a particular design situation. Axial spacings between rings 146 may vary from one-half chord to four chord lengths. A chord length is defined as one-half the difference between the inner and outer diameter of annular rings 146.

The plane of front ring 146.1 may be tilted as much as 15° relative to the propeller shaft axis 196 without appreciably affecting the thrust augmentation values. However, the upstream side of tilted or a non-tilted ring 146 should not be forward of blades 152 vortices 174 and 176 to insure proper pumping action. Downstream rings 146.2 and 146.3 may be tilted up to 45° relative to shaft 196 while maintaining one-side chordal spacing on one axial side without materially affecting the augmentation effect.

Radial offset of rings 146 downstream of first ring 146.1 may be up to one-half of a ring chord c without causing significant augmentation loss values. Tests have shown that maintaining the same internal to external diameter ratio while increasing or decreasing the internal diameter of rings 146 cause only small changes in the augmentation effect. Uniform or non-uniform ring spacings within four chord spacing showed no significant effects on the mass-flow augmentation effect.

Note that at least the leading, forward or upstream ring 146.1 is located opposite propeller 142 and preferably the second ring 146.2 is also so placed. In this manner, each ring 146.1 and 146.2 contributes to vortex conversion and enhances the flow augmentation effect. Additional downstream rings 146 can be used with those such as 146.3 located as an extended ring structure downstream of propeller 142. Such extended rings 146 can be of greater diameter to accommodate the expanding wake.

These considerations also apply to the ringcage structures shown in FIGS. 2, 4, 6, and 7 and vice-versa, the design criteria described with reference to the air fans shown in these figures are applicable to the boat propeller and ringcage structure.

Rails 154 form a portion of ringcage 144 and perform the structural function of supporting and locating, guarding and protecting the structure from impact. The hydrodynamic forces generated by vectors, such as 172, FIG. 10, are resisted by rails 154 and distributed to gearcase 139 to be eventually applied to boat 30. Rails 154 locate rings 146 in relation to each other and to the plane of propeller 142.

On the upstream side, rails 154 are slanted radially and diagonally to the direction of waterflow to deflect objects from propeller 142 and partially from rings 146. FIG. 16 shows rails 154 attaching rings 146 to gearcase 139 and to anti-ventilation plate 138. This provides a security guard for impact at four points about the periphery of propeller 142. To supplement the guarding and deflecting of objects, animals, and personnel, secondary appropriate intercostal rails 154 may be added to other angular positions between those shown in FIG. 16 and located forward of the first ring 146.1. The cross-sectional shapes of rails 154 between and along the rings 146 generally are selected to minimize drag, and their cross-sectional profiles have airfoil shapes with their leading edges facing outboard away from the shaft 196.

Shaft 196 is a standard outboard motor type with a retainer nut and a Woodruff key hub drive means. Other propeller attachments can be used. The propeller mount consists of three major structures—namely, a forward hub 210, an aft hub 212, and propeller blades 152. Other parts include pins 214 to position blade pitch angles and screw attachment pieces to clamp the hub parts and blades in their appropriate positions. The forward hub 210 has an interior diameter which enables a slide fit on shaft 196 and has an exterior shape to supplement streamlining. The inner diameter of aft hub 212 also fits on shaft 196 and has a torque-transmitting Woodruff key to carry drive loads from shaft 196 to blades 152.

Blades 152 each are of a one-piece structure suitable for a fixed-position, variable-pitch design. Their hydrodynamic, essentially rectangular surface, is an edge beveled-flat plate which at its radial top has a width of 2% to 15% of the chord. The beveled, leading, and trailing edges extend from 10% to 25% of the chord on the radial top surface, as selected by use considerations. As the thrust from blades 152 is mostly influenced by the leading-edge bevel, it may be noted that for some applications, the amount or need for an aft bevel of blades 152 is not critical. The equal beveling of both edges permits blades 152 to be used for either left or right-hand propeller rotation by appropriate pitch angle selection. Left-hand rotation is used in the FIGS. of this application and is defined as an anti-clockwise motion when viewed from a downstream position.

Each blade 152 has a round cross-section shank 216 which is faired into the blade on its radially-inward, inboard end. It has an inboard integral disk-shaped flange 218 on the round shank. The adjacent surfaces shown in FIG. 16 of front hub 210 and aft hub 212 have semi-round cutouts to match the diameters of shanks 216. The radially-outward surface of diskshaped flange 218 bears against the concentric-diameter flats formed against the inner walls of forward hub 210 and aft hub 212. The adjacent surfaces of forward hub 210 and aft hub 212 are designed to have a slight separation to permit a clamp-up of their grooved surface by fasteners 220 on blade shanks 216. This disk-shaped flange 218 of blades 152 have a series of radial holes drilled parallel to blades 152 at a constant radius from the central axis. These holes are sized to permit sliding of blades 152 on pitch pins 214 in a radial sense when no clamping force is applied by fasteners 220. Pitch pin 214 is rigidly fastened to either forward hub 210 as shown in FIG. 16 or alternately to aft hub 212. The holes in blade disk 218 permit the selection of equal blade pitch angles for each blade 152, as required. Clamp-up by fasteners 220 prevents blades 152 inboard motion to disengage the pitchlocating setting. Aft hub 212 has an internal flange on its aft end which is positioned between the shaped end of the shaft 196 and its retaining nut. Loosening of fasteners 220 permits in place adjustment of the blade pitch angles without removing propeller 142 from shaft 196.

Figure 17:
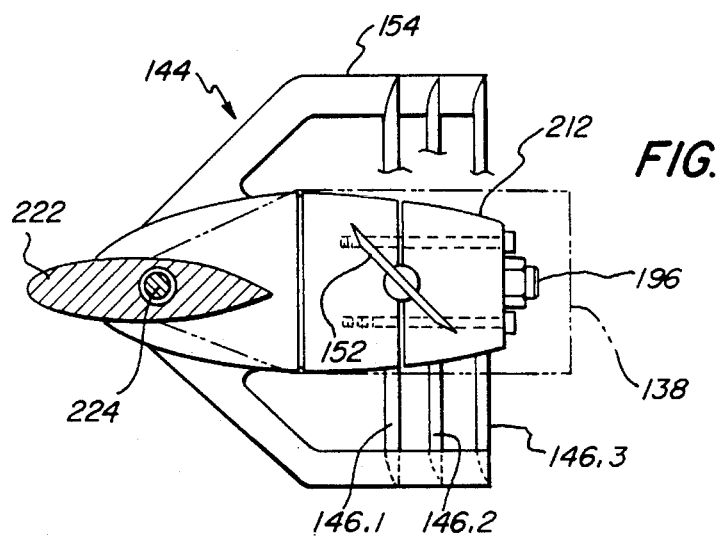
FIG. 17 is a plan view of the propulsive thrust-ring system of FIG. 16.

FIG. 17 is a plan view of the propulsive thrust ring system as applied to outboard motor 132. It shows anti-ventilation plate 138 in phantom for clarity reasons. A lower propeller system support strut 222 and vertical power drive shaft 224 are shown for orientation purposes. Lower gearcase 130 has protectivelyangled rails 154 blended into it. As noted heretofore, extra intercostals with this general shaping are also a design variation. ringcage 144, propeller 142, and the pitch adjustment means are in accordance with FIG. 16. Although two blades 152 are shown in FIGS. 16 and 17, additional blades are suitable for a propeller 142.

The test data for FIGS. 12, 13 and 14 were obtained with a three-bladed propeller system. Force and moment data have been found by four-bladed propeller 44 testing. A parameter defined as "solidity ratio" is the following:

$$\text{Solidity Ratio} = \frac{\text{Total area of the blades}}{\text{Swept disk area}}$$

This parameter has been test evaluated with a varying number of rings and propellers to optimize the selection of components for a range of 0.06 to over 1.0. When the aspect ratio of an air propeller blade is 3.0, a solidity ratio of 0.20 to 0.35 is appropriate. While for a water use blade, the solidity ratio of 1.0 is a reasonable value. Fans as may be used to cool electronic components, such as in computers, typically have solidity ratios as high as 1.8 to 2.0. Hence, solidity ratios may vary from about 0.06 to about 3.0 for the various propeller applications of the invention.

Figure 18:
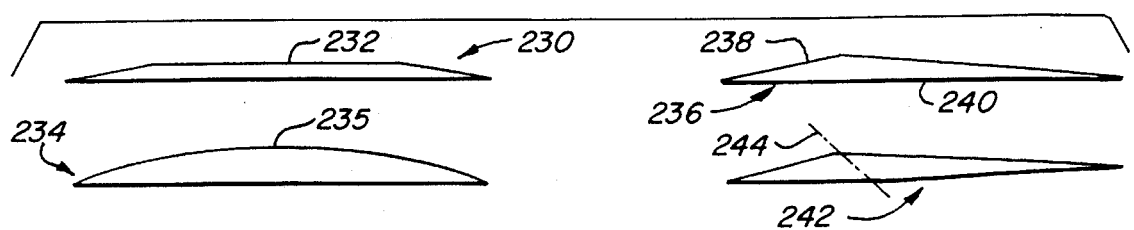
FIG. 18 are cross sectional views of blade sections suitable for a low-aspect ratio propellers used in this invention.

FIG. 18 shows special propeller blade cross-sectional profiles which can be used in addition to a standard NASA or other aircraft propeller cross-sections. Flat plate beveled-edge section 230 is for a thin airfoil (2%–15%) chord thickness, to impart special hydrodynamic/aerodynamic properties for the propulsive thrust-ring system. Flow at angles of attack to the leading-edge, assumed to be to the left on FIG. 18, separates at the sharp point and reattaches on the flat, thick portion 232 aft of the bevel. A suction bubble forms between the bevel surface and the free stream flow. This generates a surface lift at an efficiency which permits an effective system to be designed. Accuracy in contour and surface finish of the profile becomes secondary in that the bubble effect is predominant in lift determination on the upper surface. Lower surface pressures sum up as positive which tend to be insensitive to surface roughness. The bevel surface extends from the leading edge to a minimum of about 8% chord and a maximum of about 30% chord.

Section 234 has a large radius/chord ratio arc forming the upper surface 235 and a thickness ratio range like section 230.

Section 236 has a 25% chord-beveled leading edge 238, a flat bottom 240, and a tapered section aft of the bevel. Section thickness ratios vary like section 230 values.

Section 242 has a double-taper which commences at the slanted, dotted line 244 shown in FIG. 18. This line passes through the top intersection of the tapered surfaces at 25% of the section chord. Its angle to the horizontal which may be as much as 75° fore or aft of the vertical, depending on use, determines the intersection of the front and rear bottom lines at the section. Droop snoots, as commonly used for airfoil sections, may be incorporated to further modify these profiles as may the many types of slots and flaps used in aircraft designs.

Figure 19:
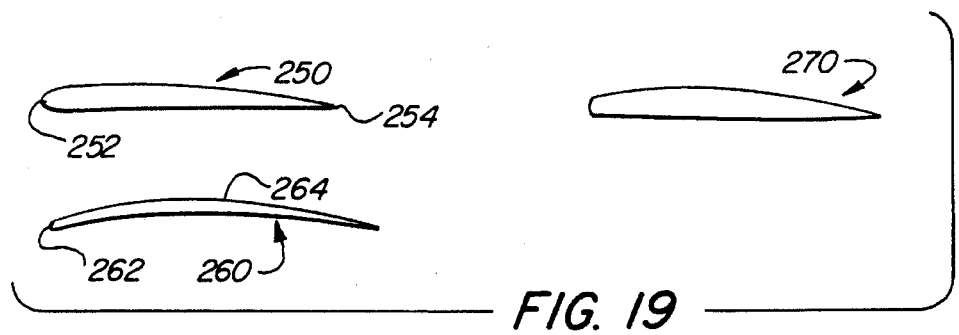
FIG. 19 are cross sectional views of rings used in a ringcage system of this invention.

FIG. 19 shows cross-sectional profiles used for rings 248 in a multiple ring structure of this invention. Section 250 is the standard NASA or other equivalent aircraft profile. The leading edge 252 on the left in FIG. 19 forms the inner diameter of ring 248, and the trailing edge 254 is the outer diameter. This section of ring 248 may be set at an angle to the plane of ring 248 and corresponds to an airfoil section angle of attack. Ringcage flow is from the trailing edge 254 to the leading edge of the section edge which is a 180° difference from normal airplane wing operation. Tests on ring section thicknesses from 9% to 38% chord indicate 15% to 20% chord as the best to maximize static mass flow augmentation.

Section 260 of FIG. 19 is for a bent-plate ring 248 with a rounded-edge 262 on its inner diameter. This cupping design compensates for a flatplate lack of upper curvature. The shape of section 260 may approximate the top profile line of standard NASA airfoils. The induced velocity in a multiple structure mostly affects this top surface 264 with static pressure occurring on the underside surface. Therefore, the top surface is most important and should be smooth without protuberances or indentations which might adversely change the flow.

Figure 20:
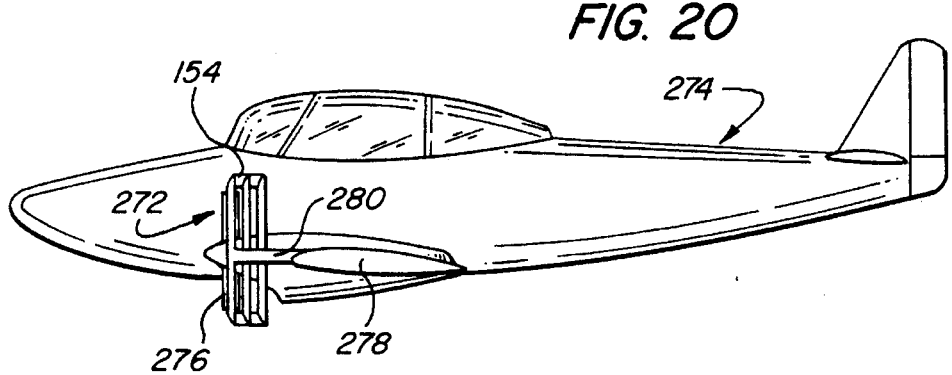
FIG. 20 is an elevation view of an aircraft installation of a ringcage system of this invention with a tractor configuration on a private aircraft.

Section 270 of FIG. 19 is a specially designed airfoil for application for a first upstream in a multiple ring structure 272 in FIG. 20. It consists of a Clark-Y type airfoil section, which is well-known in aircraft engineering, with nose modifications. The top solid and the aft lower solid line plus the dashed line are the original shape of the Clark-Y. A vertical line tangent to the Clark-Y nose radius intersects a forward extension of the normally-flat undersurface of the airfoil. The corner created by the intersection of these lines is blended by a radius equal to that of the Clark-Y leading edge radius. This airfoil section modification appears to give increased augmentation flow to the ringcage 272.

FIG. 20 is the application of a propulsive thrust-ring system 272 to a twin-engine light aircraft 274 as used for private flying. A tractor propeller 276 designed for air use is located on the engine. Ringcage 272 attaches to airplane wing 278 by two spaced-apart extension beams 280 which fasten to rails 154. Supplemental benefits to the basic performance increases are the better field of vision available and the lighter weight landing gear associated with a smaller propeller.

Figure 21:
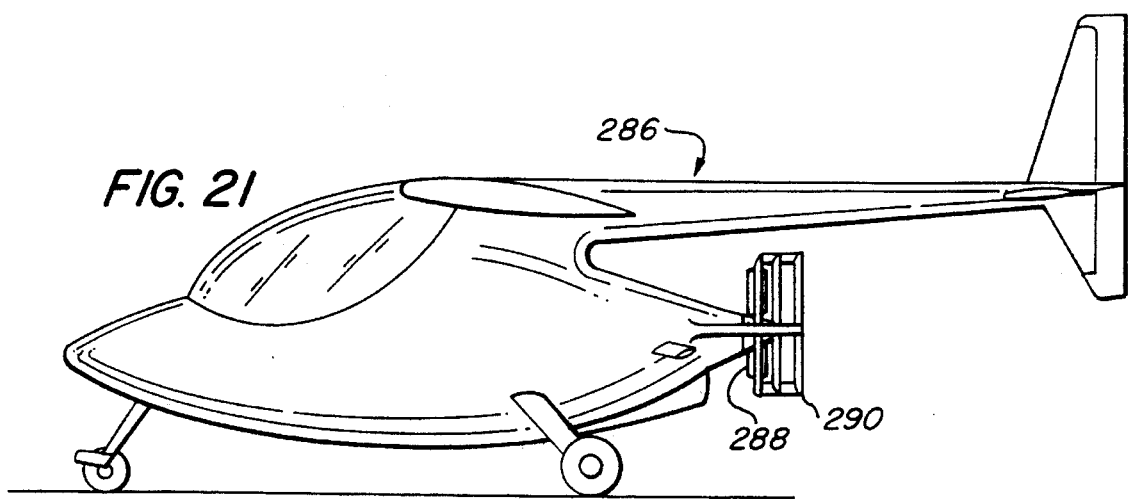
FIG. 21 is an elevation view of an aircraft installation of a ringcage system of this invention with a pusher configuration on a private aircraft.

FIG. 21 is the application of a propulsive thrust-ring system of this invention to a single-engine pusher aircraft 286. Propeller 288 designed for aircraft use is located on the engine in the location of the normal propeller. A ringcage 290 is attached to the fuselage by suitable means.

Figure 22:
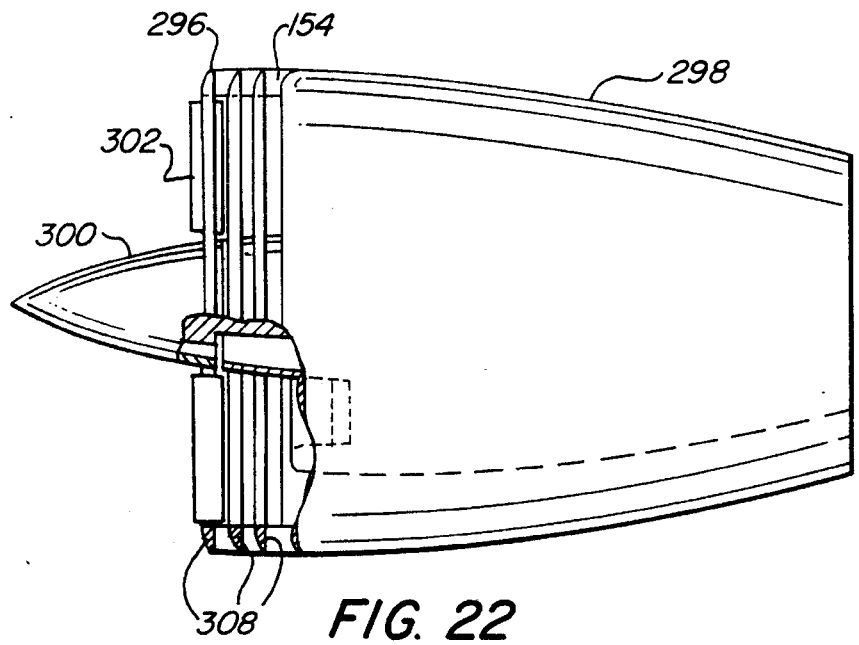
FIG. 22 is an elevation view of an installation of a ringcage system on a tractor turbine fan configuration for a transport.

FIG. 22 is an application of a propulsive thrust-ring system 296 to a bypass-fan nacelle 298 as used on a transport airplane wing or fuselage. Ringcage 296 mounts to the front bulkhead structure of the nacelle through rails 154. An intake fan cone 300 guides air into propeller 302. Intake 304 is the turbine engine air path while duct 306 conducts faninduced flow to be mixed prior to exhaust at intake station 304. Airflow vectors approach ringcage 296 from the outside and are turned into the rings 308 by induction. An inertial separation of entrance air particles occurs with this turning action to provide a source of cleaner air for the engine. This reduces particle wear on turbine blades to increase the service life of the engine.

Figure 23:
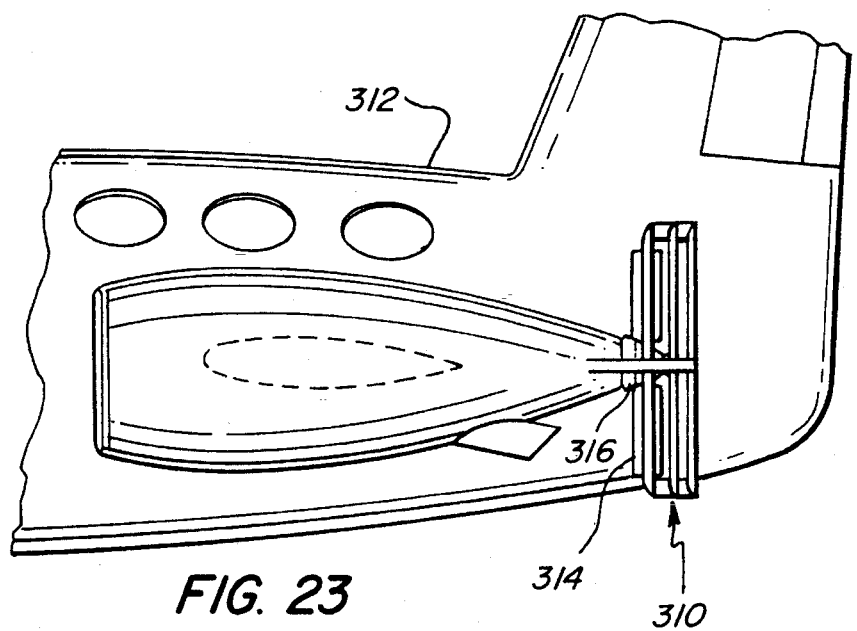
FIG. 23 is an elevation view of an installation of a low-aspect-ratio fan and ringcage system of this invention in a pusher configuration for a turbine on a transport.

FIG. 23 is the application of a propulsive thrust system 310 of this invention for a transport aircraft 312. Propeller 314 is applied with a noise cone 316.

Figure 24:
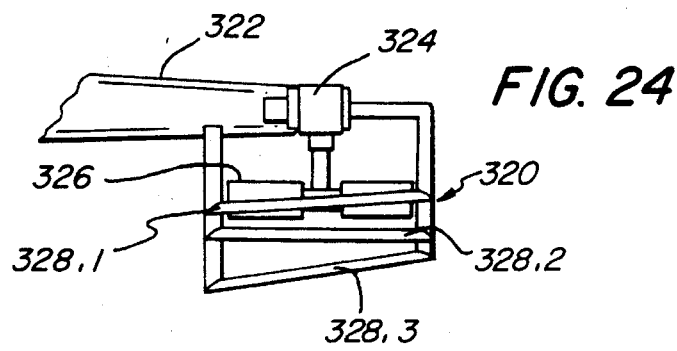
FIG. 24 is a top plan view of a quiet helicopter tail rotor provided with a low-aspect-ratio fan and ringcage system in accordance with the invention.

FIG. 24 is the application of a propulsive thrust-ring system 320 to a helicopter tail cone 322 which carries a right-angle gearbox 324 on its aft end. A propeller 326 as previously described replaces the standard helicopter tail rotor. Rings 328.1, 328.2 and 328.3 are tilted at various angles to the centerline of the axis of rotation of propeller 326. This permits a focusing of the vortex noise to different areas around and away from the helicopter. Ring angles are variable in adjustment, as required, to accomplish this function.

FIGS. 25 through 33 are examples of various applications for a propulsive thrust-ring system of this invention.

Movement of Air

FIG. 25 is a heating/cooling fan 340 driven by electric motor 324. A fan base 344 can have partially-rotating and oscillating action mechanism as is well known. A propeller 348 is mounted on the motor shaft and a ringcage 350 with rings 352 is attached or is formed as a part of the motor casing. Ringcage 350 has nichrome or other high electrical resistance heating wires embedded in the rings for heating purposes as more particularly shown in FIG. 30. Revolutions per minute of the fan propeller are variable, as required.

FIG. 26 is an exhaust fan system 354 mounted in a wall 356 using a propeller 358 and ringcage 360 in accordance with the invention. There is sufficient clearance 362 between the ringcage 360 and wall 356 to provide a free passage of air or gases into propeller 358 and through the apertures 364 between rings 366 for vortex conversion and positive augmentation to airflow as suggested by arrows 368.

Movement and/or Heating of Air

FIG. 27 shows a ceiling fan 370 using a ringcage 372 and rings 374 in accordance with the invention. The construction can be like fan 340 in FIG. 27.

FIG. 28 shows the application of my invention in a blower/dryer 380 as might be used for hair drying or in an alternate size for industrial drying purposes. It has a handle 382 and an intake grill 384 which is attached to handle 382 by conventional means. An electric drive motor 386 has a ringcage 388 attached to its casing and a propeller 390 is attached to the motor shaft. A screen 392 permits heated air to be exhausted for its drying usage. Switches 394 and 396 are provided for motor control and heat control respectively.

FIG. 29 shows a fan heater 400 for use on an automobile or other vehicle. A similar design but with a larger size can be used for space heating of commercial buildings, homes, etc. An exterior tube 402 supports a ringcage 404 of this invention with narrow supports 406. A motor 408 is positioned and supported by struts 410. A propeller 412 is mounted on the motor shaft. In order to prevent noise being transmitted to the vehicle, a noise isolation pad 414 of a flexible material such as rubber or an elastomeric material is used. Bonding of pad 414 to tube 402 and a mounting plate 416 permits attachment of heater 400 to the vehicle for installation.

FIG. 30 shows a cross-section of a ringcage of this invention and as can be used for a fan and heater application as illustrated in FIGS. 25–29. The ringcage 420 has nichrome high resistance wires 422 embedded in rings 424 and which for this reason are made from a non-electrical conducting material such as ceramic. A heat-conducting ceramic can be used. Two turns of wire 424 are shown in each ring 424 but another plurality may be used, and these are led out through one or more of hollow rails 426. Leads 428 fasten the nichrome wires to the electrical supply controls. Cross-hatching of the ceramic material has not been used in order to clarify the position of the wires and their phantom locations.

Figure 31:
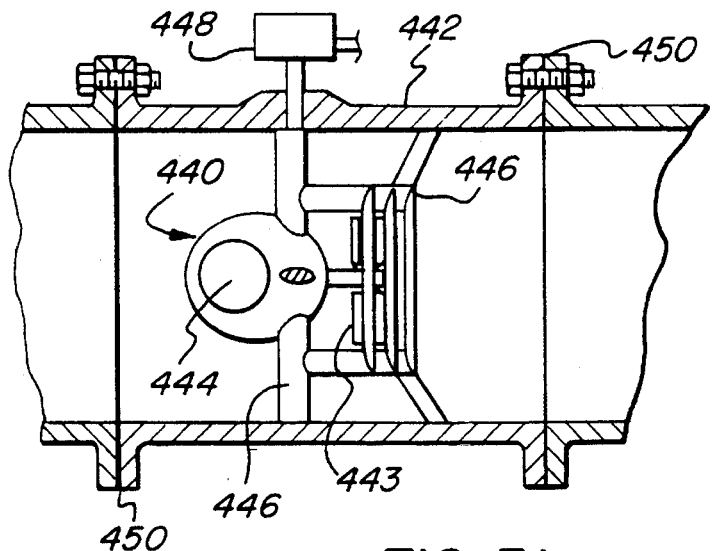
FIG. 31 is a side view in elevation and partial sectional view of an inpipe line pump for gases, fluids, and slurries with a low-aspect-ratio propeller and ringcage system of this invention.

FIG. 31 shows a propulsive thrust-ring system 440 in accordance with this invention for moving air, gases, oils, slurries, et al., as in a pipeline section 442, a mine shaft, or possibly a wind tunnel. A propeller 443 with its propulsive motor 444, and a ringcage 446 are located in the cross-sectioned pipe 442 and retained by a support 446. A power supply control 448 feeds power to the motor 444 through structure 446 by appropriate leads. Pipeline joints 450 enable removal of pipeline section 442 for maintenance or other service.

Mixing

Figure 32:
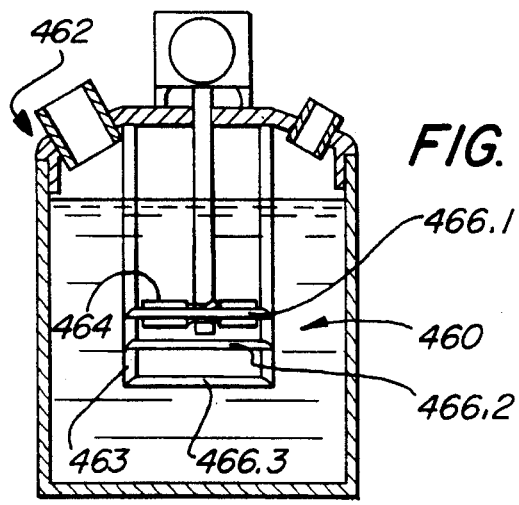
FIG. 32 is an elevation and partial section view of a mixer with a low-aspect-ratio propeller and ring-cage system in accordance with the invention.

FIG. 32 shows the application of a propulsive thrust-ring system 460 in accordance with the invention in a mixer 462 of materials. A ringcage 463 and a propeller 464 in axial alignment with at least one of the rings 466.1 is used.

Air Moving and Fuel Burning

Figure 33:
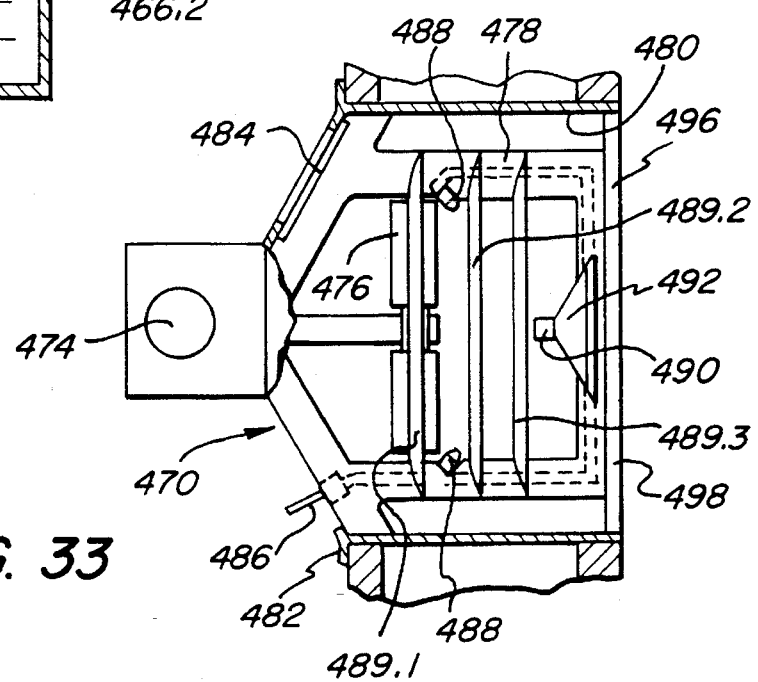
FIG. 33 is an elevation and partial section view of an oil burner with a low-aspect-ratio propeller and ringcage.

FIG. 33 shows an application of a propulsive thrust-ring system 470 in accordance with the invention as an element in a fuel oil or gas burner 472. A motor 474 drives a propeller 476. A ringcage 478 of this invention is supported within a tube 480 by attachment 482. An anti-flame back door 484 admits air to the burner. ringcage 478 has an integral, interior fuel system 486 which conducts the fuel to nozzles 488 for spraying or exhausting into the mixing air between rings 489. Ignition of the flammable mixture is by an igniter 490 which is supported by a conical flame holder 492. A downstream bar support 496 holds flame holder 492 and igniter 490. The electrical system for sparking igniter 490 is well known and is, therefore, not shown in FIG. 33. Burner 472 is mounted to a boiler 498 at attachment 482 and may be removed from tube 480 for maintenance and other service.

Operation of Invention

A propulsive thrust-ring system of this invention can operate in three applications, namely: to propel a water or air vehicle; to move air, gases, fluids, or slurries; or as a mixer for various substances. When used to propel watercraft, a ringcage and associated propeller are designed to operate in a manner compatible with the required function. For example, to retrofit a propulsive thrust-ring system to an outboard motor as shown and described with reference to FIG. 8 to conserve fuel and provide impact safety without losing performance, the following would be done:

1. Outboard motor 132 would operate at its normal propeller revolutions per minute. The installation of a replacement propeller 142 with a diameter that is 60% of the diameter of the original screw would be used.
2. Ringcage 144 would use three annular rings 146 with chords of about 15% of the radius of propeller 142. Rings 146 would be spaced at about one chord length from each other. Ring cross-sectional thicknesses would be about 20% of the ring chords c.
3. Depending on the size of propeller 142, several intercostals would be placed forward of first upstream ring 146.1. Diameters of screw propellers common to standard commercial designs would be replaced as follows:

| Screw Diameter | Propeller 44 Diameter |
| --- | --- |
| 17.78 cm. (7 inches) | 10.68 cm. (4.2 inches) |
| 25.4 cm. (10 inches) | 15.24 cm. (6.0 inches) |
| 35.56 cm. (14 inches) | 21.34 cm. (8.4 inches) |
| 50.8 cm. (20 inches) | 30.48 cm. (12 inches) |

By placing upstream ring 146.1 of ringcage 60 about the exterior of propeller 142, locating rails 154 to the side and below propeller 142, smaller size propellers noted above, would be difficult to inadvertently contact. Objects or people approaching ringcage 144 in the water are deflected by the forward part of bent rails 154 as shown in FIG. 17. Extra intercostals and a crowding of rails 154 to the lower part of ringcage 144 are additional preventatives for avoiding disastrous contacts.

Augmentation Action

Ringcage action with propeller form a fluid augmenter whereby, as illustrated in FIGS. 2 and 10, primary flow from a propeller generates a secondary flow about multiple rings. The energy which causes this excellent mixing comes from the induced velocity vortices generated by the thrust action of the propeller. Normally, this energy causes rotation of the tip vortices which is converted with the rings to useful thrust. Without the rings, these vortices would be a cause of wasted energy.

The sense of the tip vortex circulation can be counter-clockwise as viewed from the trailing edge of a propeller blade tip. The effect of this circulation is to cause an inflow about the tip surface of the rings. This inflow intimately mixes with propeller vortices and the main flow and moves downstream creating an expanding, larger mass, slower moving wake.

The result is a propulsive thrust cage which has no large drag to reduce propulsion thrust. Extra ringcage thrust occurring from previously wasted, tip-vortex energy gives an additional 60% or more propulsive force and permits a downsizing of the propeller with consequent savings in fuel. For example, with a 24% ringcage thrust augmentation at a static thrust condition, FIG. 13 shows a 50% horsepower savings.

Use of beveled-edge propeller blades produces highly efficient thrust and angles of attack where high-aspect ratio blades would have stalled. This occurs through the boundary layer energization by the various aforementioned vortices. The shape and beveling of the leading edges of propeller blades makes their vortices extremely strong compared to those of a standard screw 46. As a result, a multiple ringcage structure of this invention has its induced flow much enhanced by the high strength of these normally wasted vortices. A ringcage structure of this invention thus complements the propeller to achieve high efficiency by using heretofore vortex-wasted induced power.

The operation of a propulsive thrust-ring system of this invention in translation as on a boat or airplane results in an increased augmentation as shown by the curves in FIG. 14. This occurs because the primary and secondary water flows are dealing with a larger volume of water or air per unit time than when at rest. As a ringcage thrust augmentation increases with speed, the propeller does not have to work as hard as a standard screw at the same velocity for the same total thrust. Total system efficiency thus increases with forward motion. Of course, when the boat speed increases to the point when the strength of the vortices of the propeller cannot provide the turning energy for the secondary flow, the augmentation becomes limited. This occurs at boat speeds much above current values.

Noise Reduction

Noise from propellers is generally a function of thrusting surface inefficiency in air, gas, or fluid flow. Strong vortices which leave airfoil surfaces, propeller blades, and other sources are by themselves noisy and are referred to as "rotational noise". Impacting of these on other blades, on each other, or on surfaces of the vehicle can cause structural vibrations and other secondary noise responses. In designing a quiet-vehicle propeller, for example, blades are selected to be lightly-loaded by using large planform areas and to turn at slow tip speeds to keep the strength of the tip vortices down. This creates a heavy and inefficient system. A ringcage in accordance with the invention induces extra flow which achieves the destruction of these vortices and their associated noise. Waterflow vectors such as 172 surround and mix with the vortices to create an efficient wake with a greatly reduced noise level. As the propeller is a small diameter type producing large thrust at a reduced tip speed, the noise level is lower than a standard screw. Cavitation effects which create noise in water are also reduced as propeller tip speeds are typically 50% lower than conventional screws. This retards the formation of cavitation bubbles with their rough, oscillating wakes.

FIG. 15 is based on data of a high-speed air propeller operating from 11,000–15,000 RPM both with and without a ringcage structure of this invention, Breakup of propeller vortices reduces the overall noise levels; the comparison of this noise reduction at the same thrust level on FIG. 15 proves this occurs. Additionally, smoke flow visualization and flow probing with tufts confirm this mixing. Interference of rails with radial, annular, inflow vectors appears minimal using these investigative techniques.

Wake Flow

Downstream wake investigations of a propulsive thrust-ring system of this invention at about one ring diameter after the aft face of downstream third ring 146.3 (see FIG. 10) indicates a flow diameter with a cross-sectional area about four times the standard, reduced-diameter screw wake. The wake expands to exceed the outside diameter of the rings 146, and contains apparently no unmixed propeller vortices. However, as relative motion occurs between the wake and the surrounding water, by the laws of fluid dynamics, a vortex sheet must occur to act as a "ball-bearing" between them. The vortices formed by this action were below the test apparatus capacities for size measurement; however, these could be felt with the fingertips of the experimenter by lightly stroking the wake and surrounding water intersection. Another flow phenomenon which occurred at a frequency of about one-twentieth of propeller speed was a weak, large, diameter vortex which spiraled about the exterior surface of the wake. Its spiral screw lead is about five wake diameters, and it has very low energy. The explanation for the occurrences of this exterior wake vortex probably was in the generation of the blade vortex street.

Inertia Separator

Turning of medium vectors into the vortex mixing area requires two energy expenditures, namely, one to turn the fluid to move fluid inboard over the multiple rings and one to turn the fluid to move it downstream. Overcoming the energy losses associated with accomplishing these turns occurs by tapping into formerly wasted propeller vortices energies. The first turn of these vectors has the additional effect of providing an "inertia separator" for the flow of particles or debris suspended in the fluid. This acts by the bypassing of heavier or larger particles over the exterior diameter of the rings and downstream. Their inertia, therefore the name, carries them by a ringcage of this invention and prevents their entry into the spaces between the rings. As the induced-flow mass produced through a ringcage forms a good percentage of the total flow, this cleaning effect for air by bypassing icing particles or rain on airplane turbine intakes is of social value in that safety is increased.

For cleaning the portion of air or fluid which does not pass through the ringcage, the sharp leading edge of propeller blade such as 142, in conjunction with multiple rings, act as a power chopper to cut-up seaweed, odd debris, or other floating items which would be small enough to pass through guarding rails. For aircraft, birds, or other foreign materials would be similarly treated. Chopped-up or chipped materials would be passed downstream in a small size to clear the system without damage. Leading-edge protective materials for propeller blades can be used such as hardened steels or other metals common for such uses.

System Pitch Angle Operation

To provide reverse thrust to the watercraft propeller, a conventional variable-pitch propeller using a blade 152 would operate as follows:

1. Pitch angles in forward motion would be selected to match the operating conditions. For example, a high-pitch angle of thirty-five to forty-five degrees would be used for high speeds.
2. A moderate pitch angle of fifteen to thirty degrees would be selected for an efficient cruise.
3. A typical pitch angle reversal for quick stopping of the vehicle would be to a minus angle of about thirty degrees. This minus angle would cause the now underside of a blade 152 to effectively become its upper surface. Tip vortices 176 and root vortices 174 now reverse their rotational direction to generate a thrust acting to slow the vehicle.

Analysis Methodology

In order to analyze the thrust and torque of the propulsive thrust-ring system to predict its operation, the following methodologies common to propeller analyses are used. These methods may be noted as the Momentum Theory, the Blade Element Theory, the Lifting Line Theory, as well as combinations with other wellknown theoretical approaches for force and moment evaluations. Correlation of test data and the application of the above-noted industry common theories is excellent. Separate test measurements of ringcages and propellers described with reference to FIGS. 2 and 10 and the resulting thrust values indicate no adverse effects by the ringcage.

Thrust augmentation is solely from the pumping action of the propeller's induced flow about multiple rings. Because of the rotational direction of the propeller blade vortices, an inboard radial flow is generated over the front or upstream surfaces of the flow augmenting rings. Rear or downstream surfaces exhibit approximately an ambient total pressure that indicates a lack of fluid motion. This, in effect, creates a thrust normal to the forward or upstream surface of the rings in the same direction as the thrust from the propeller.

In addition, downstream turning by an angle of as much as 90° of the flow over the forward surface of rings generates lift forces which exactly match those computed by simple deflected airstream theory, i.e., the bentplate forces predicted by mass flow turning described in most beginning aerodynamic textbooks.

Heating/Cooling Fan

When a propulsive thrust-ring system of this invention is used for other than its thrust-producing qualities, it operates in a similar manner as heretofore, but to accomplish different results. The fan and/or heater has two modes of operation. The propeller in a fan mode acts as a generator of primary flow vectors and secondary flow vectors to move quantities of air. The augmentation effect permits a 60% of normal fan diameter to move the same quantity of air as a standard fan. The size of the fan motor can be one-half the horsepower of the standard fan motor yet move as much air. The feature of muting propeller noise is significant. Diameters may be reduced as for outboard motor propellers.

Operation of a ringcage structure as a fan heater is as illustrated in FIG. 30 through the use of enclosed, high resistance nichrome wires to heat the rings. Flow of air or other fluids over the top surfaces of the rings and support rails picks up heat from the rings by convection and carries it to the mixing area. This heat is then more evenly distributed by the mixing of the vortices into the final air or fluid stream. Flow over the downstream side of rings 42 is at a minimal with most of the under surface being at close to static atmosphere pressure. This downstream surface radiates heat to the front surface of the next downstream ring where it is picked up by airstream convection over the top surface for mixing. This occurs for all rings except for the last downstream ring where rear surface provides a radiant heat source. The heated air can be used for warming a room, drying, or other applications.

Oil Burner

The oil burner of FIG. 33 operates with a cooling air flow along the wall 480 to insulate against the heat. The flame burns downstream of flame holder 492 and is applied to the furnace boiler for its heating system action.

When a propulsive thrust-ring system of this invention is shown in FIGS. 6, 7, 26, 28, 29, 31, and 33 in conjunction with an exterior tube, this serves to direct the flow as required and helps to perform the function of the product.

Conclusions, Ramifications, and Scope of Invention

It can be seen that my invention is a highly economical, effective method to provide safety in the water from propeller strikes when boats are driven over people, manatees, and other water creatures. It uses the previously-wasted induced power of a propeller to permit large reductions in fuel usage in combination with a safety cage. Tests show that twice the distance may be traveled for the same fuel as used with a standard boat propeller. The noise reductions are over one intensity level at 1.5 propeller diameters from the axis of the propeller. Its cage and propeller construction are simple, cheap to manufacture, use standard materials, and are readily applied to retrofitting outboard and inboard motors for boats; systems for light, medium, and heavy propeller-driven aircraft; and ships for commercial use. Stopping of a speeding boat by its thrust reversal capability when the propeller is an infinitely-variable pitch type is another anti-accident feature.

As the extra induced thrust generated by the rings at high speed is estimated to be approximately equal to that of the propeller alone; this permits a speed factor increase of about 1.25 for the same engine horsepower. When used for jet engine intakes, the propeller provides bypass air and an inertia separation of the ringflow air occurs. Debris is then bypassed and not drawn into the engine; the sharp edge fan used on transport aircraft would act as a chopper to reduce bird debris to small pieces incapable of destroying the engine. Seaweed and other small particle debris which penetrates the ringcage on a boat would be equally treated.

While my description contains many specificaties, these should not be construed as limitation on the scope of the invention, but that as preferred embodiments thereof. Many other variations are possible. For example, a multiple ring structure as described herein employs circular rings. In some applications somewhat differently-shaped rings may be used without departing from the scope of the invention. The term ring as used herein encompasses such other shapes. Some of the applications of the invention are the following:

1. Thrust Producing Usage
    a. Submarine tow motors for scuba divers,
    b. Electrical power quiet-trolling outboard motors for fishing use,
    c. Flying submarines where air/water propulsion system is common and a small fuel volume is required for submersion,
    d. Lifting circular wings and propellers for STOL aircraft,
    e. Tilting-propeller aircraft for hovering and conversion to a forward flight configuration with VSTOL operation,
    f. Tilting-wing propeller vehicle for VSTOL operation,
    g. Tip propulsion of rotor blades for both small and large aircraft,
    h. Propulsion of ultra light aircraft,
    i. Propulsion of ground effect machines and swamp boats,
    j. Hydrofoils.
2. Air and water moving apparatus:
    a. Leaf blower with light-weight motor mechanism,
    b. Wind-tunnel-power system for increased velocity or reduced power requirements,
    c. Water tunnel for aquatic testing for engineering information,
    d. Water pump for automotive applications,
    e. Blower for cooling auto radiators,
    f. Blower for cooling brakes,
    g. Quite defrosting fans for vehicles, homes, frost-free refrigerator use,
    h. Pumping of grains,
    i. Cooling fan for electronic equipment,
    j. Circulating fans, in ducts, or ductless in offices, factories, or other buildings,
    k. Snowblowers,
    l. Vacuum cleaners
    m. Clothes dryer,
    n. Dehumidifier by blowing air against a cold plate or inside a cooled tube.
3. Heaters and Coolers:
    a. Fans with heating elements and ducts,
    b. Electric furnace hot-air heater,
    c. Steam-heat fans with hollow, steam-filled ringcages,
    d. Heat exchanger with fan cooling of rings,
    e. Air conditioner with expanding freon coolant in the hollow rings to remove heat from the air,
    f. Convection-oven heating fan unit.
4. Mixers:
    a. Kitchen mixer for cooking,
    b. Coffee grinder,
    c. Food processors,
    d. Paint mixer,
    e. Chemical products mixer,
    f. Sewer mixing and solid chopper.

Accordingly, the scope of the invention should be determined not by the embodiments illustrated, but by the appended claims.

What is claimed is:

1. A fan for moving air comprising:

a motor, a propeller coupled to the motor to be driven by the motor into rotation about an axis, said propeller having a plurality of blades having an axial span along the axis;

a ringcage structure mounted around the propeller, said ringcage structure including a plurality of axially-spaced rings with an annular aperture between said rings, at least one of said rings being within the axial span of the propeller blades and another of said rings being located downstream of said one ring; said rings being so axially spaced from each other and being so selected to provide an air flow augmentation through said aperture from a conversion of propeller generated tip vortices so as to augment the air flow from the propeller.

2. The fan as claimed in claim 1 wherein a plurality of rings are located within the axial span of said propeller blades.

3. The fan as claimed in claim 2 wherein a plurality of said annular apertures for air flow augmentation are located within the axial span of said propeller blades.

4. The fan as claimed in claim 1 wherein said rings have a ring chord dimension and wherein the ring chord dimension and the axial spacing between said one ring and an axially-successive ring are selected to provide said flow augmentation.

5. The fan as claimed in claim 4 wherein the ring chord dimension is in the range between about 10% to about 50% of the radius of the propeller.

6. The fan as claimed in claim 5 wherein the spacing between at least said one ring and an axially-successive ring is selected in the range from about one-half to about four ring chord dimensions.

7. The fan as claimed in claim 4 wherein the ring chord dimension, said axial spacing, and said propeller are selected to provide a static pressure versus mass flow curve that is substantially straight.

8. The fan as claimed in claim 7 wherein said propeller blades have a relatively low-aspect-ratio.

9. The fan as claimed in claim 8 wherein the propeller blades have an aspect ratio in the range from about 0.1 to about 3.

10. The fan as claimed in claim 9 wherein the propeller has a solidity ratio in the range from about 0.6 to about 3.

11. The fan as claimed in claim 10 wherein at least one of said rings is inclined at a desired angle relative to the rotational axis.

12. The fan as claimed in claim 9 wherein the rings forming said annular aperture have cross-sectional airfoil shapes with an airfoil surface facing upstream of said air flow.

13. The fan as claimed in claim 12 wherein the ring airfoil surfaces each have a normally blunt leading edge and a normally thick trailing edge, with said blunt leading edge being inboard and said thin trailing edge being outboard, so that airflow from said tip vortices moves from the trailing edges across the airfoil surfaces towards the blunt leading edges.

14. The fan as claimed in claim 1 wherein said propeller blades have radial tips which are spaced from said one ring by a clearance s whose size is in the range from about 3% to about 10% of the radius of a propeller blade.

15. An axial flow propeller fan for moving gas comprising:

an axial flow propeller for rotation about an axis and having a plurality of radially-extending blades; said blades being oriented with an axial span selected to move said gas in a downstream direction along the axis during blade rotation;

a ring cage structure formed of a plurality of axially-spaced gas flow enhancing rings located around the axis, with a plurality of said gas flow enhancing rings being axially-located around the blades within their axial spans;

said propeller blades having tips which generate tip vortices during rotation with the shape of the blades being selected to strengthen the tip vortices; the blade tips and the radially-inner edge of said gas flow enhancing rings being in sufficiently close proximity and with dimension of said axial gas flow enhancing rings and their axial spacings being selected to form apertures through which tip vortices from the blades augment the gas flow in said downstream direction;

whereby tip vortices can be converted to useful gas flow for enhanced performance of the axial flow propeller system.

16. The axial flow propeller system as claimed in claim 15 wherein the rings have a ring chord C which is less than about 59% of the radius R of the propeller and wherein the radial clearance between the tips of the propeller blades and inner edges of said gas flow enhancing rings is less than about 10% of said Radius R and the axial distance between rings is in the range from about one half to about four ring chords C.

17. An apparatus for enhancing the mass gas flow from a propeller in a fan comprising:

a propeller to move a gas from an upstream side in a downstream axial direction while generating tip vortices from tips of propeller blades; and means for generating a flow augmenting aperture extending at least partially around the propeller, said flow augmenting aperture having a preselected size and is selectively spaced from the tips of the propeller blades so as to convert mass flow from tip vortices into an augmentation of useful axially downstream directed mass flow from said propeller.

18. The apparatus for enhancing the mass flow from a propeller as claimed in claim 17 and wherein said means for generating said flow augmenting aperture generates a plurality of said pumping apertures in successive axially spaced locations within the axial span of said propeller blades, with each of said pumping apertures converting mass flow from tip vortices into an augmentation of useful axially downstream directed mass flow from said propeller.

19. The apparatus as claimed in claim 18 wherein said means for generating said flow augmenting aperture comprises a plurality of ring elements spaced around the propeller blades.

* * * * *